US012167274B2

(12) United States Patent
Venkataraman et al.

(10) Patent No.: US 12,167,274 B2
(45) Date of Patent: Dec. 10, 2024

(54) REFLECTIVE QoS ENHANCEMENTS

(71) Applicant: Apple Inc., Cupertino, CA (US)

(72) Inventors: Vijay Venkataraman, San Jose, CA (US); Yingjie Zhao, Pleasanton, CA (US); Jason Ke, Cupertino, CA (US); Ahmed M Salem, Ottobrunn (DE); Bobby Jose, San Diego, CA (US); Haijing Hu, Beijing (CN); Krisztian Kiss, Hayward, CA (US); Longda Xing, San Jose, CA (US); Martin Kugler, Poing (DE); Robert Zaus, Munich (DE); Roland Gruber, Sauerlach (DE); Sridhar Prakasam, Fremont, CA (US); Srinivasan Nimmala, San Jose, CA (US); Sudeep Manithara Vamanan, Nuremberg (DE); Zhanfeng Jia, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/480,979

(22) Filed: Sep. 21, 2021

(65) Prior Publication Data
US 2022/0141705 A1    May 5, 2022

Related U.S. Application Data

(60) Provisional application No. 63/107,397, filed on Oct. 29, 2020.

(51) Int. Cl.
*H04W 28/02* (2009.01)
(52) U.S. Cl.
CPC ............................ *H04W 28/0268* (2013.01)
(58) Field of Classification Search
None
See application file for complete search history.

(56) References Cited

U.S. PATENT DOCUMENTS

| 2016/0143078 A1* | 5/2016 | Jeong | H04W 28/0278 370/329 |
| 2019/0028920 A1* | 1/2019 | Pan | H04L 47/24 |

(Continued)

FOREIGN PATENT DOCUMENTS

WO    WO2019219619    *  5/2019

OTHER PUBLICATIONS

Extended European Search Report for European Patent Application No. 21205347.4; 9 pages; Mar. 23, 2022.

(Continued)

*Primary Examiner* — Andre Tacdiran
(74) *Attorney, Agent, or Firm* — Kowert, Hood, Munyon, Rankin & Goetzel, P.C.

(57) ABSTRACT

Apparatuses, systems, and methods for Reflective Quality of Service (RQoS) enhancements. Methods may include enhancements for both UE behavior and network function behavior. Network function behaviors may include enhancements to UPF behavior and SPF behavior. Enhancements to RQoS may include methods for resetting an RQoS indicator (RQI) bit for downlink packets of a flow destined for a UE, methods for generating a flow ID to include in a SDAP header destined for a UE, methods for using the flow ID to limit L3 and L4 header parsing, methods for sending/receiving feedback regarding processing of the RQI bit, methods for maintaining a QFI mapping table, methods for skipping parsing of SDAP header fields, methods for specifying and signaling a QoS Flow Identifier (QFI) range to a UE, methods for limiting downlink header parsing, methods for updating a QFI, and methods for performing high efficiency RQoS processing.

20 Claims, 24 Drawing Sheets

(56) References Cited

U.S. PATENT DOCUMENTS

| | | | | |
|---|---|---|---|---|
| 2019/0306744 A1* | 10/2019 | Huang-Fu | ............. | H04W 72/23 |
| 2020/0145876 A1* | 5/2020 | Dao | ...................... | H04W 28/06 |
| 2020/0196133 A1* | 6/2020 | Kawasaki | ............ | H04W 28/18 |
| 2020/0275302 A1* | 8/2020 | Youn | ...................... | H04W 28/24 |
| 2021/0037425 A1* | 2/2021 | Kainulainen | ......... | H04W 28/12 |
| 2022/0086682 A1* | 3/2022 | Watfa | ................... | H04W 28/24 |

OTHER PUBLICATIONS

Samsung "Reflective QoS discussion"; 3GPP SA WG2 Meeting #127-bis S2-185287; Newport Beach USA; 5 pages; May 28, 2018.

\* cited by examiner

REFLECTIVE QoS ENHANCEMENTS

PRIORITY DATA

This application claims benefit of priority to U.S. Provisional Application Ser. No. 63/107,397, titled "Reflective QoS Enhancements", filed Oct. 29, 2020, which is hereby incorporated by reference in its entirety as though fully and completely set forth herein.

FIELD

The invention relates to wireless communications, and more particularly to apparatuses, systems, and methods for reflective QoS enhancements.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for reflective QoS enhancements. Methods may include enhancements for both UE behavior and network function behavior. Network function behaviors may include enhancements to UPF behavior and SPF behavior.

For example, to reset a Reflective Quality of Service (QoS) Indicator (RQI) bit for downlink packets of a flow destined for a UE, a UPF of a core network may be configured to determine that reflective QoS (RQoS) for the flow destined for the UE is enabled, determine that a QoS Flow Identifier (QFI) value for the flow requires updating and/or installing, and initiate a backoff timer prior to re-setting an RQI bit to a value of 1 for downlink packets of the flow destined for the UE. A value of the backoff timer may be provided to the UPF, e.g., by an SMF of the core network. Additionally, the value of the backoff timer may be less than a value of an RQoS inactivity timer (RQ timer). As an example, the value of the backoff timer may be determined as RQ Timer/k, where k may be greater than or equal to two. As another example, the value of the backoff timer may be determined as MAX $\{X, MIN\{RQ\ Timer/2, Y\}\}$, where X may be specified in seconds and Y may be specified in minutes.

As another example of RQoS enhancements, to reset an RQI bit for downlink packets of a flow destined for a UE, a UPF of the core network may be configured to determine that RQoS for the flow destined for the UE is enabled, determine that a QFI value for the flow requires updating and/or installing, and set an RQI bit to 1 for a first N packets of the flow sent to the UE. Note that the value of N may be greater than or equal to 1. Note additionally, that the value for N may be provided by an SMF of the core network.

As a further example of RQoS enhancements, to reset an RQI bit for downlink packets of a flow destined for a UE, a UPF of the core network may be configured to determine that RQoS for a flow destined for the UE is enabled, determine that a QFI value for the flow requires updating and/or installing, set an RQI bit to 1 for a first N packets of the flow sent to the UE, and initiate a backoff timer prior to re-setting the RQI bit to a value of 1 for downlink packets of the flow destined for the UE. Note that the value of N may be greater than or equal to 1. Note additionally, that the value for N may be provided by an SMF of the core network. A value of the backoff timer may be provided to the UPF, e.g., by an SMF of the core network. Additionally, the value of the backoff timer may be less than a value of an RQoS inactivity timer (RQ timer). As an example, the value of the backoff timer may be determined as RQ Timer/k, where k may be greater than or equal to two. As another example, the value of the backoff timer may be determined as MAX $\{X, MIN\{RQ\ Timer/2, Y\}\}$, where X may be specified in seconds and Y may be specified in minutes.

As another example of RQoS enhancements, to generate a flow identifier (ID) to include in a service data adaptation protocol (SDAP) header destined for a UE, a UPF of a core network may be configured to determine that RQoS for the flow destined for the UE is enabled, generate a flow ID for the UE, where the flow ID is per protocol data unit (PDU) session, and include the flow ID in an N3 encapsulation header of a downlink packet destined to the UE for a flow for which a QFI requires updating or installation.

Further, to use a flow ID to limit parsing of layer 3 (L3) and layer 4 (L4) headers of an SDAP header associated with an RQoS feature of a network, a UE may be configured to maintain a flow ID to QFI mapping table per PDU session with the network, receive a downlink packet with a RQI bit set to a value of 1, where the downlink packet includes the flow ID in an SDAP header, determine whether the flow ID included in the downlink packet is in the QFI mapping table, in response to determining that the flow ID is in the QFI mapping table, determine whether there is a change in QFI fields of the SDAP header, and, in response to determining that there is a change in QFI fields of the SDAP header, update the flow ID to QFI mapping.

As a further example of RQoS enhancements, to send feedback regarding processing of an RQI bit associated with an RQoS feature of a network, a UE may be configured to receive a downlink packet with RQI bit set to a value of 1, process the downlink packet to derive one or more RQoS rules for uplink transmissions to the network, and transmit feedback indicating and/or regarding processing of the RQI bit on an uplink connection to the network.

Further, to receive feedback regarding processing of an RQI bit associated with an RQoS feature of a network, a UPF of the network may be configured to transmit a downlink packet with the RQI bit set to a value of 1, receive feedback indicating and/or regarding processing of the RQI bit, and, after confirming that L3 and L4 header fields and a QFI value included in an SDAP header feedback match an uplink packet data report received from an SMF of the network for a flow associated with the downlink packet, discontinue including the RQI bit for subsequent packets of the flow on the downlink.

As a further example of RQoS enhancements, to maintain a QFI mapping table for downlink packets associated with RQoS, a UE may be configured to receive a downlink packet with an RQI bit set to a value of 1, compare a QFI value included in the downlink packet with a locally maintained QFI mapping table, confirm whether the QFI value included in the downlink packet exists in the QFI mapping table, and, in response to determining that the QFI value is included in the QFI mapping table, skip parsing of L3 and L4 header fields included in the downlink packet.

As another example of RQoS enhancements, to skip parsing of SDAP header fields associated with an RQoS feature of a network, a UE may be configured to determine that a throughput for downlink packets associated with the RQoS feature and/or an overall aggregated downlink throughput across all flows exceeds a threshold and, in response to determining that one of the throughputs exceeds the threshold, parse SDAP header fields for every Nth downlink packet of a flow that is received with an RQI bit set to a value of 1.

As a yet further example of RQoS enhancements, to specify and signal a QFI range to a UE, an SMF of a core network may be configured to reserve a QFI range with a same 5G Standardized QoS Identifier (5QI) value and signal a mapping between QFI values and 5QI without association to an Internet Protocol (IP) flow to the UE.

As another example of RQoS enhancements, to limit downlink header parsing associated with RQoS, a UE may be configured to determine that processor utilization associated with parsing of the downlink packet headers associated with RQoS has exceeded a threshold, initiate a backoff timer in response to the processor utilization exceeding the threshold, and ignore further RQI updates received in downlink packets until expiration of the backoff timer.

As another example of RQoS enhancements, to limit downlink header parsing associated with RQoS, a UE may be configured to determine that processor utilization associated with parsing of the downlink packet headers associated with RQoS has exceeded a threshold, trigger a PDU session modification procedure in response to the processor utilization exceeding the threshold, and indicate, as part of the PDU session modification procedure, no support for RQoS.

As yet another example of RQoS enhancements, to update a QFI, a network entity may be configured to determine that an SDF will last longer than a specified duration and apply an updated QFI mapping for the flow via NAS control plane signaling with a UE.

As still another example of RQoS enhancements, to perform high efficiency RQoS processing, a UE may be configured to receive a downlink packet with an RQI bit set to a value of 1, determine whether a last received downlink packet in the flow had an RQI bit set to a value of 1, and, in response to determining that the last received downlink packet in the flow had an RQI bit set to a value of 1, skip full parsing of an SDAP header included in the downlink packet.

As another example of RQoS enhancements, to perform high efficiency RQoS processing, a UE may be configured to receive a downlink packet with an RQI bit set to a value of 0, determine whether a last received downlink packet in the flow had an RQI bit set to a value of 0, and, in response to determining that the last received downlink packet in the flow had an RQI bit set to a value of 0, parse an SDAP header included in the downlink packet.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
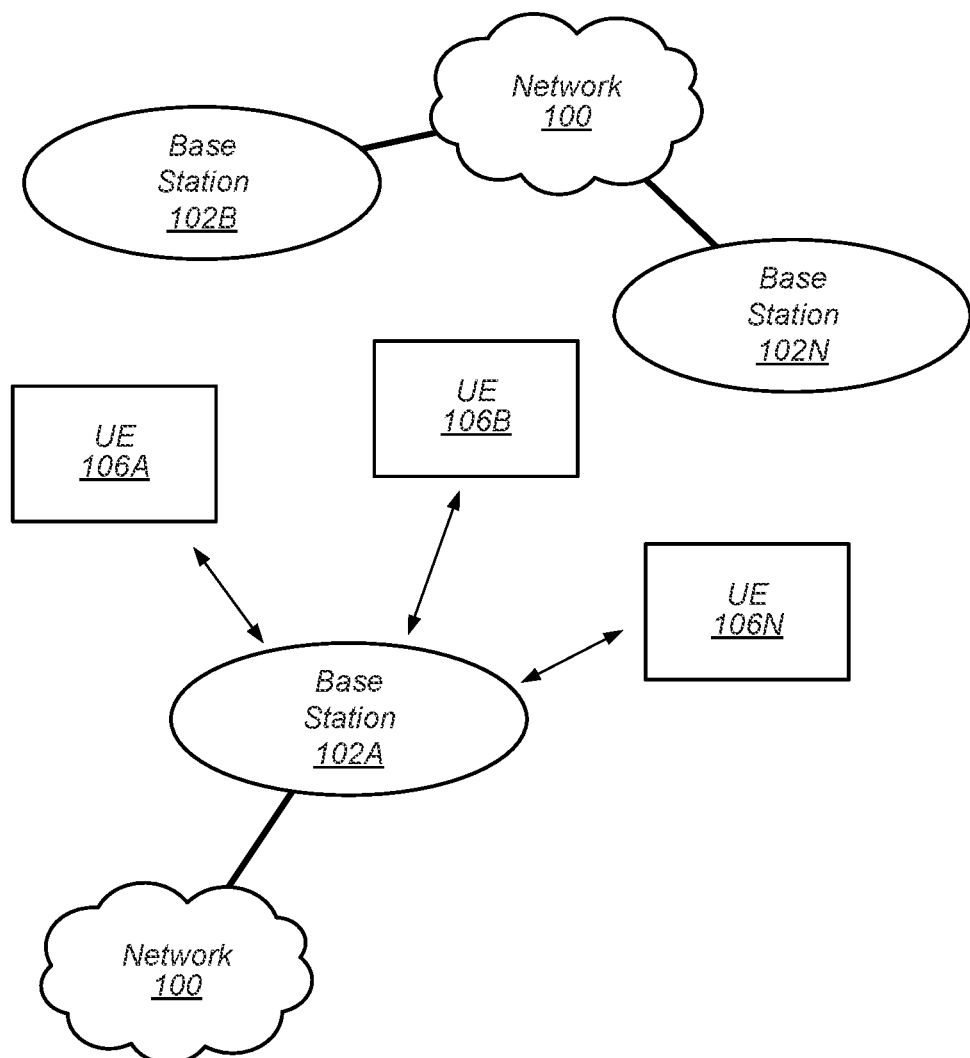
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
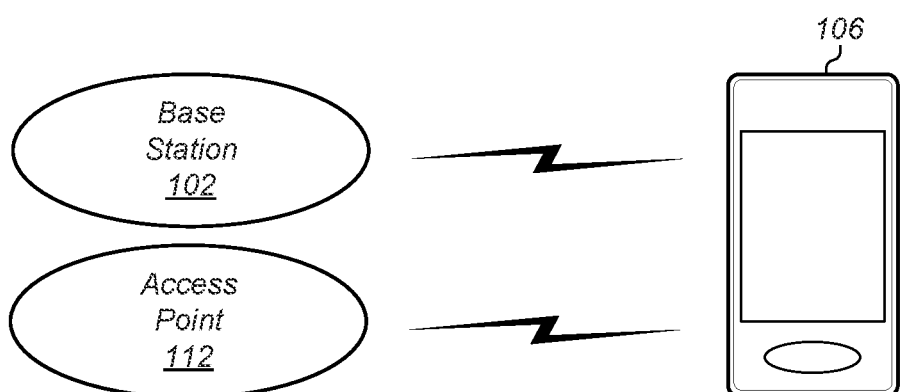
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
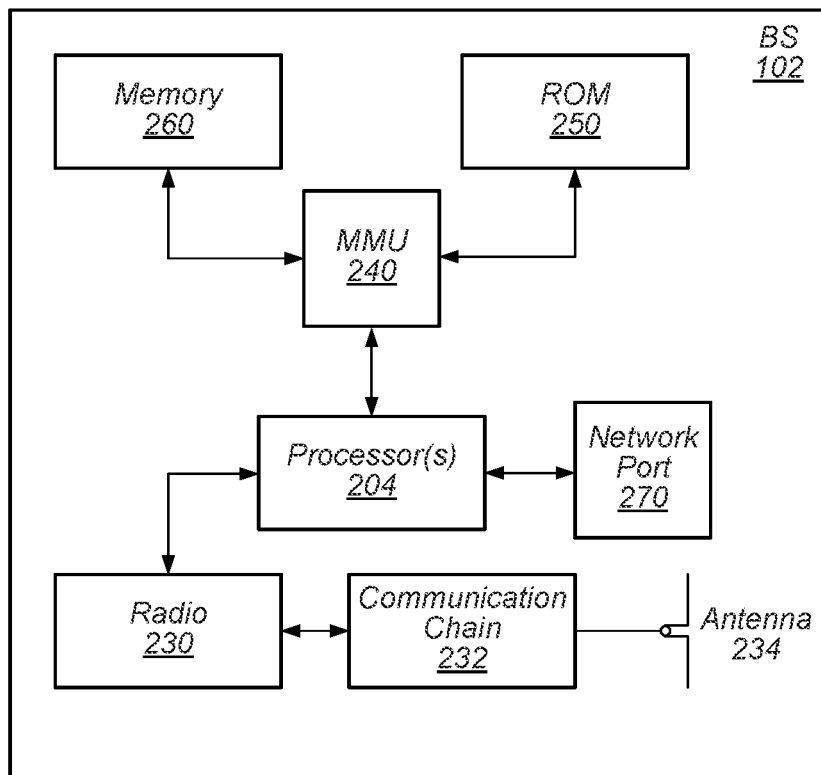
FIG. 2 illustrates an example block diagram of a base station, according to some embodiments.

FIG. 2: Block Diagram of a Base Station

Figure 3:
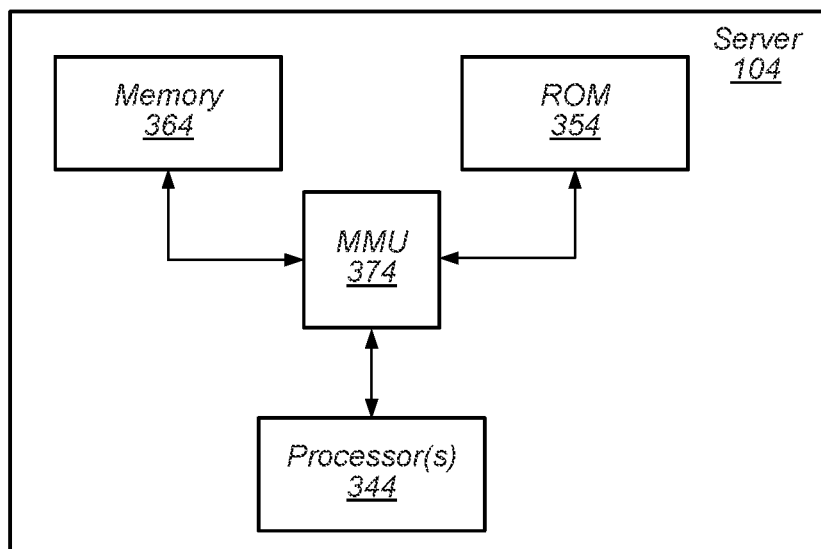
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
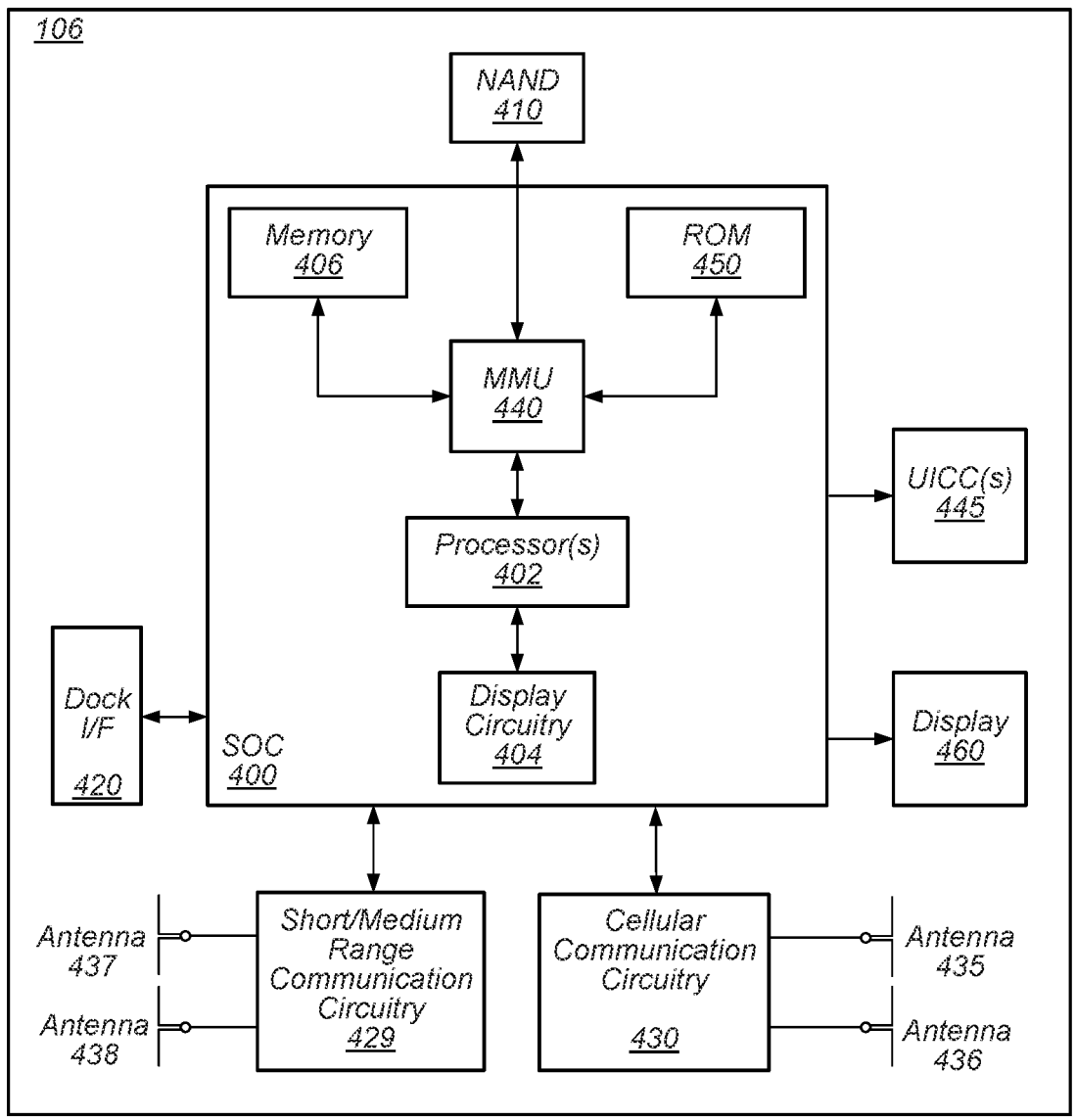
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMS may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMS in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMS in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for reflective QoS enhancements, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
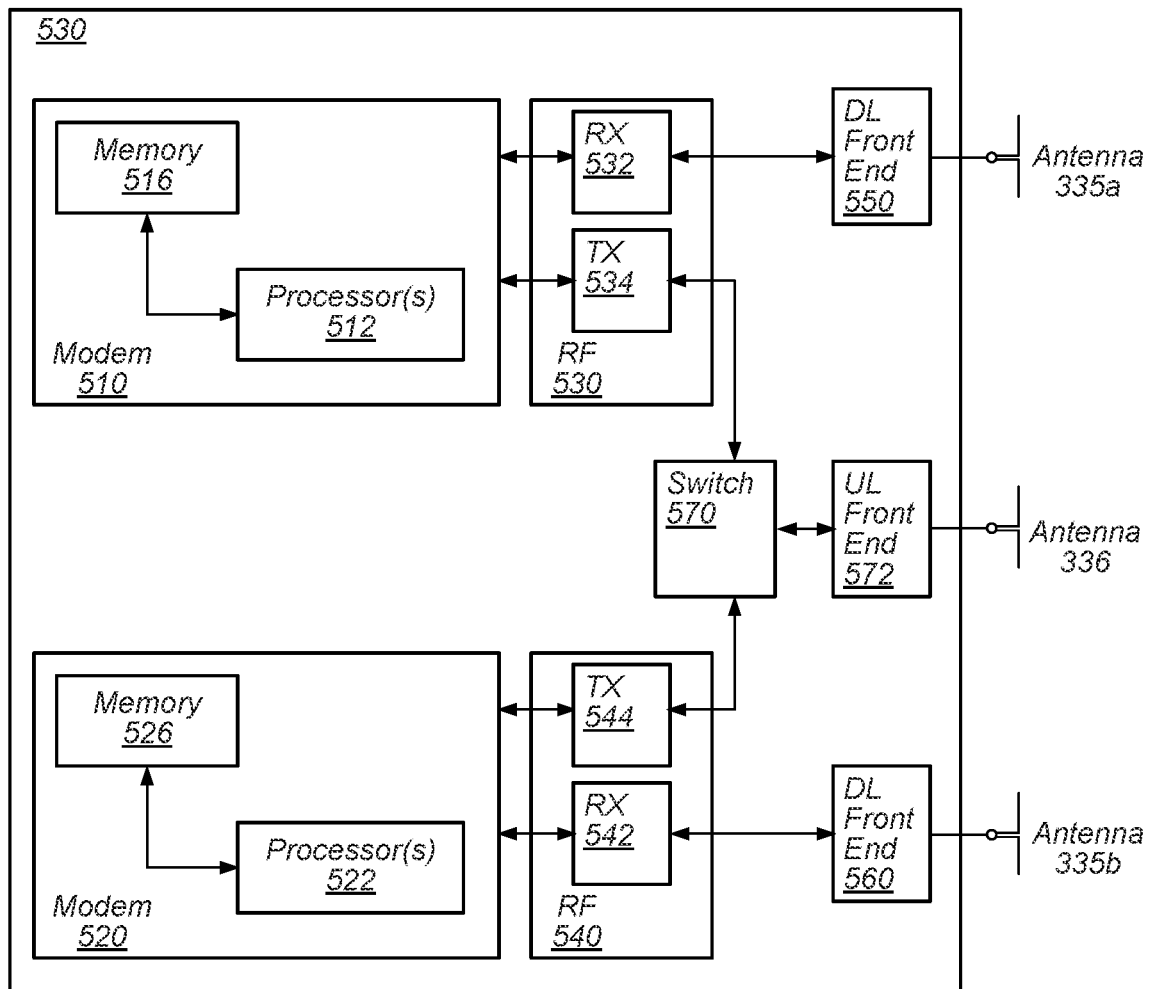
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435*a-b* and 436 as shown (in FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods reflective QoS enhancements, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
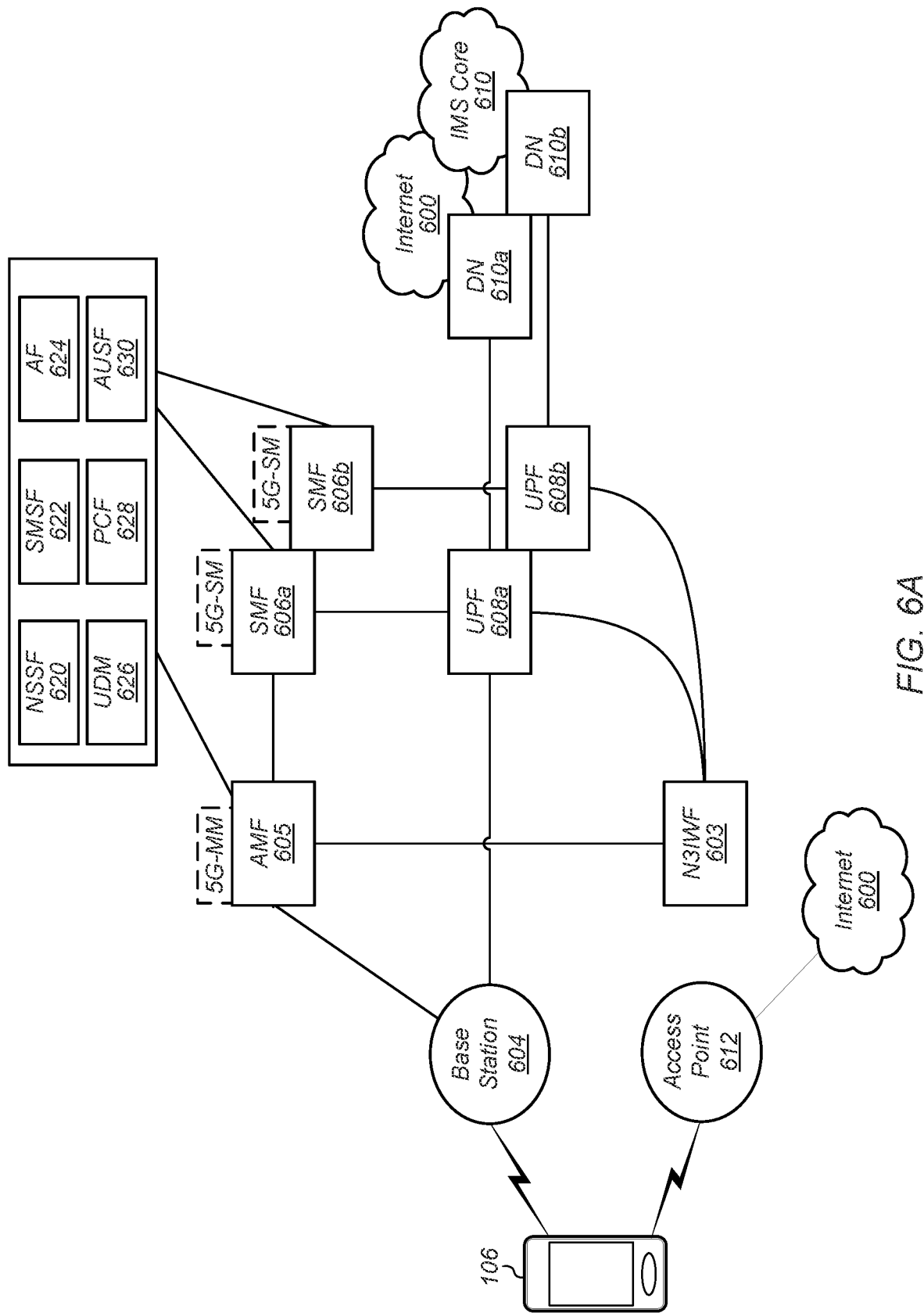
FIG. 6A illustrates an example of a 5G network architecture that incorporates both 3GPP (e.g., cellular) and non-3GPP (e.g., non-cellular) access to the 5G CN, according to some embodiments.
Figure 6B:
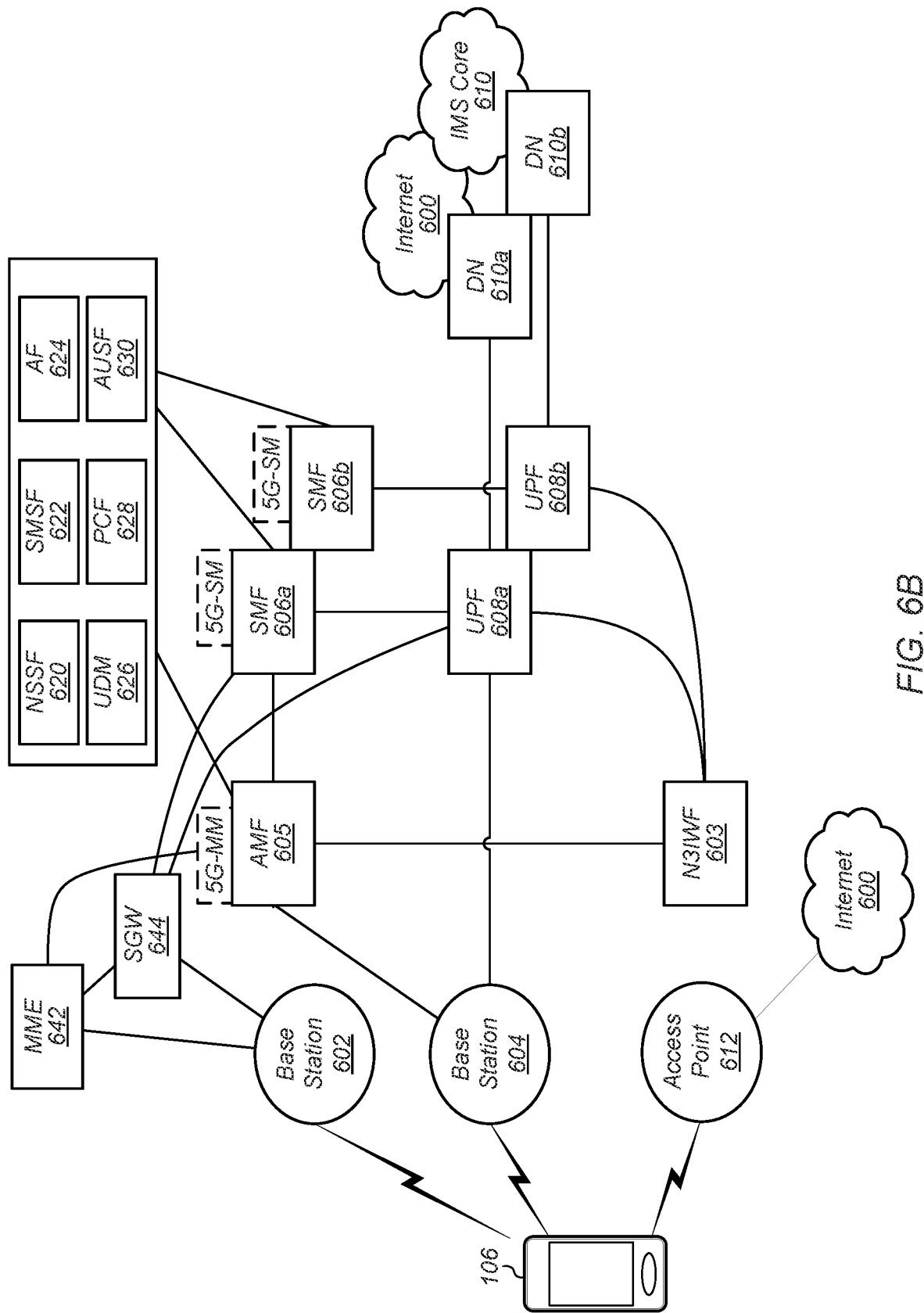
FIG. 6B illustrates an example of a 5G network architecture that incorporates both dual 3GPP (e.g., LTE and 5G NR) access and non-3GPP access to the 5G CN, according to some embodiments.
Figure 7:
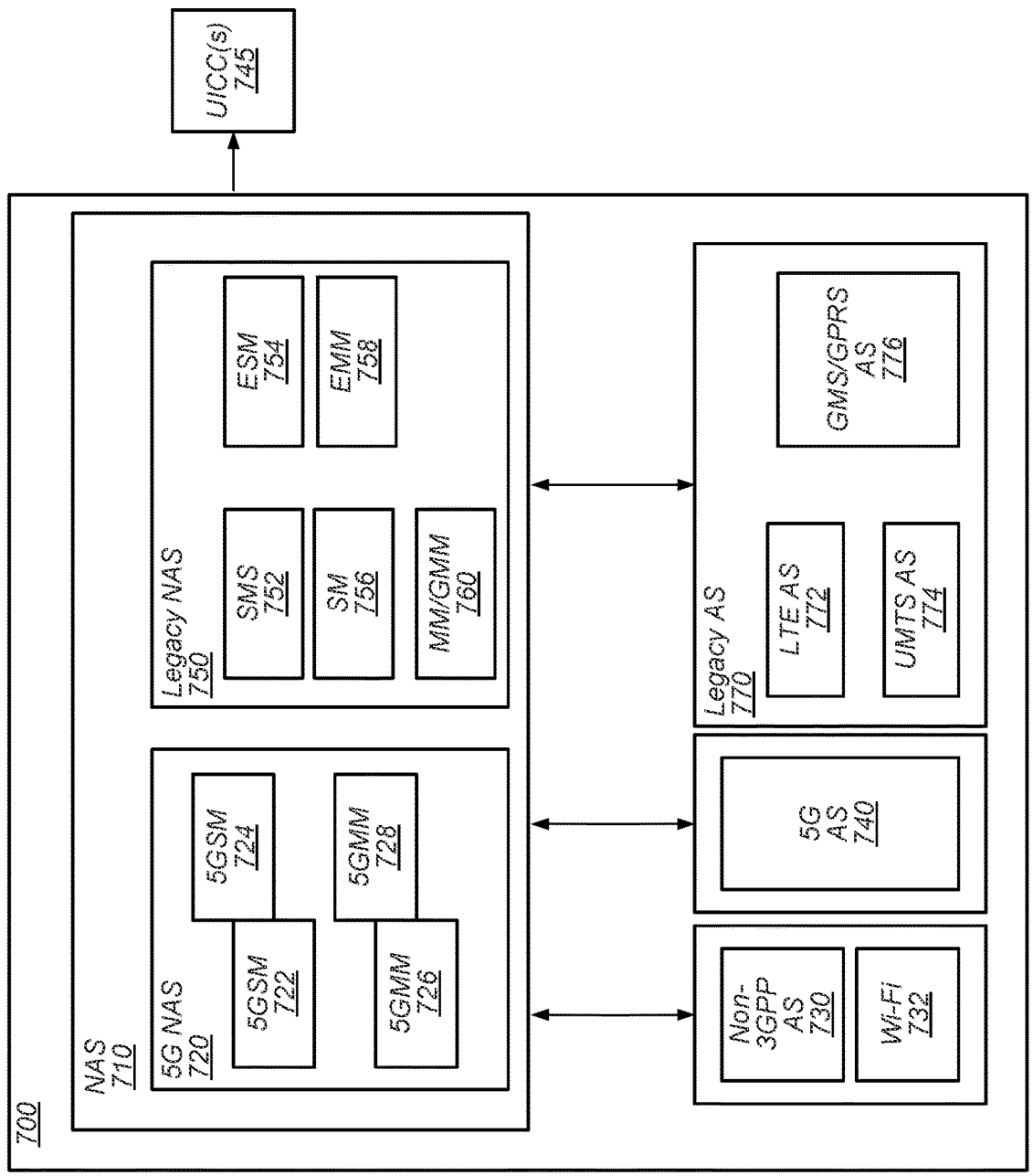
FIG. 7 illustrates an example of a baseband processor architecture for a UE, according to some embodiments.

FIGS. 6A, 6B and 7: 5G Core Network Architecture—Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP interworking function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 606 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above described network entities may be configured to perform methods to improve security checks in a 5G NR network, including mechanisms reflective QoS enhancements, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods reflective QoS enhancements, e.g., as further described herein.

Reflective QoS Enhancements

Current specifications for 5G cellular communication systems introduce the concept of Reflective quality of service (QoS), which is a mechanism to perform QoS in the uplink with reduced signaling between a UE and a network (e.g., as compared to 4G QoS mechanisms). For example, with Reflective QoS, a UE first indicates support of Reflective QoS during PDU session establishment or modification with the network. Then, when a user plane function (UPF) receives an indication to use Reflective QoS for a certain QoS flow from a session management function (SMF), the UPF will include a Reflective QoS Indicator (RQI) field in an encapsulation header of packets sent to a base station via an N3 interface. Further, when the base station receives the RQI and QoS Flow Identifier (QFI) from the UPF, the base station will indicate the RQI and QFI to the UE as part of the Service Data Adaptation Protocol (SDAP) header. Thus, the UE will monitor the SDAP header and once RQI is set, the UE will apply the same QoS in downlink to all uplink data packet transmissions for the same SDF (service data flow) with no specific signaling to tell the UE which QoS will be used in uplink. In this manner, the downlink QoS is reflected to the uplink QoS for the same SDF.

In addition, current specifications for 5G cellular communication systems use a flow-based concept of QoS. Thus, packets are classified and marked using QFI and 5G QoS flows are mapped in the access network to data radio bearers (DRBs). Further, 5G QoS supports guaranteed flow bit rates (GBR QoS flows), non-guaranteed flow bit rates (non-GBR QoS flows), as well as mission critical guaranteed flow bit rates (Delay Critical QoS flows).

In practice, from the UE perspective, when an RQI bit is set (e.g., to a value of 1) in a downlink (DL) SDAP header, the UE is required to parse a 5 tuple (e.g., a source IP address/port number, a destination IP address/port number, and a protocol in use) from a DL transmission control protocol (TCP)/user datagram protocol (UDP)/encapsulating security payload (ESP) packet, flip the source and destination attributes (e.g., IP address and port numbers for the source and destination), install a derived UL filter rule (e.g., Reflective QoS), and map the UL IP flow to a QFI contained in the SDAP header of the DL TCP/UDP/ESP packet. Additionally, the UE is required to run a Reflective QoS (RQoS) inactivity timer (e.g., an RQ Timer) and, if and/or when no further packets of the same IP flow are received on the DL with the RQI bit set upon timer expiry, delete the UL filter rule. Note that the RQ timer may be provided to the UE by the network as part of PDU session establishment procedure. Note further, that since 5G uses a flow-based concept of QoS, multiple unique flows may have an RQI bit set in the SDAP header and may map to either the same or different QFI values on the same DRB.

Furthermore, when a Reflective QoS to DRB identifier (RDI) bit is set in the DL SDAP header (e.g., indicating whether QoS flow to DRB mapping rule should be updated), packets of the same QFI on UL are steere to the DRB on which the DL packet is received. Additionally, the UE is required to send an end marker control PDU on the old DRB indicating to the network that no more packets belonging to the QFI will be sent over the old DRB from that point onward.

However, such requirements on the UE may create processing issues for the UE. For example, UE software may not be able to meet performance requirements due to high number of back to back SDAP packets with RQI bit set and the necessity to parse the TCP/UDP/IP headers. Further, the requirement for routing payloads of back to back packets to modem DDR memory may cause system DRAM bandwidth to be very high. In addition, it is possible that some networks may set the RDI bit to 1 for back to back packets, leading to further processing and bandwidth concerns. Thus, improvements are desired in this area for efficient UE and network processing for RQoS.

Embodiments described herein provide systems, methods, and mechanisms for UE and network enhancement of Reflective QoS (RQoS). For example, in some embodiments, a UPF may apply a backoff timer before re-setting an RQI bit to 1 for packets of a flow and destined to a UE already receiving the flow when RQoS is enabled for the flow and a QFI value needs to be either updated and/or installed for a new flow. In some embodiments, a UPF may set an RQI bit to 1 for only a first "n" packets of a flow for a specific UE for which RQoS is enabled and QFI needs to be updated and/or installed for a new flow. As another example, in some embodiments, a UPF/SMF may generate a unique flow ID per UE per PDU session and use the flow ID to indicate flows for which QFI needs to be updated and/or installed.

In some embodiments, a UE may use an "end marker" after processing a first packet with RQI bit set for a flow to trigger a UPF to apply a backoff timer to the flow as described herein and/or a counter to the flow as described herein. As another example, in some embodiments, a UE may introduce a QFI mapping table and compare received DL packets with an RQI bit set to QFIs in the mapping table to determine whether to parse 5 tuples included in the DL packets. In some embodiments, the SMF may not assign a single (e.g., same) QFI value to multiple flows. In some embodiments, when UE processing threshold exceeds a specified percentage (e.g., 70%-90% depending on power status), a UE may ignore further RQI updates for a specified backoff timer and/or disable RQoS feature via a PDU session modification procedure.

In some embodiments, when a specific flow is known to be lasting longer than a specified period of time (e.g., more than one or two minutes), a QFI mapping may be updated for the specific flow via network access stratus (NAS) control plane signaling (e.g., via a network triggered PDU Session Modification procedure) instead of user plane based RQoS. In some embodiments, as part of a PDU session establishment procedure, a UE may include a maximum number of simultaneous flows (e.g., 32) the UE is capable to process when all of the flows have RQoS feature enabled and/or indicate a maximum throughput which the UE can support on DL with RQoS feature enabled.

In some embodiments, a UE may implement a method for high-efficiency RQoS (HERQ) processing. In some embodiments, HERQ processing may be used for an RQoS rule update in an established RQoS flow, e.g., an RQI value change (from 1 to 0 or from 0 to 1) may be used to indicated a new service data flow (SDF) has been added to an RQoS rule. Thus, upon RQI value change, a UE may parse the downlink header, otherwise, the UE may skip parsing of the downlink header. On the network side, when a new SDF is added to a QFI (e.g., QFI k, an existing RQoS flow) in packet N, a UPF may set an RQI bit in packet N to a value of 0 on an N3 interface and then set an RQI bit in subsequent packets (e.g., N+1, N+2, N+3, and so forth) to a value of 1 for the QFI (e.g., for QFI k).

For example, for an existing RQoS flow (e.g., QFI k), when an RQI bit changes from 1 to 0, e.g., to indicate there may be a new QoS rule carried in a downlink packet, a UE may check the packet to retrieve the new QoS rule. Upon checking (e.g., parsing) the downlink packet, if there is no new service data flow (SDF) (e.g., flow) included, the UE may follow current 3GPP TS 24.501 procedures for an RQI bit set to "0", e.g., if an RQoS timer has expired, the UE may delete an associated RQoS rule. However, if a new SDF is carried in the downlink packet, the UE may add this SDF as a new RQoS rule for the QoS flow (e.g., marked with QFI=k for instance) and put it in a "pending" state (e.g., pending SDF for QFI=k). Further, when the RQI bit changes from 0 to 1, if an SDF included in an associated downlink packet matches a "pending" SDF for QFI, then the SDF changes from pending to a valid (and/or active) RQoS rule. Additionally, the UE may restart and/or reset an RQoS timer associated with the RQoS rule. Alternatively, if the SDF included in the associated downlink packet does not match a "pending" SDF, then the SDF is considered a new RQoS rule and the UE may follow current 3GPP TS 24.501 procedures for an RQI bit set to "1", e.g., the UE may parse the associated downlink packet, determine whether the new RQoS rule exists or not and either create a new RQoS rule at the UE or reset an RQoS timer associated with the new RQoS rule.

Thus, with HERQ processing, a UE may only need to retrieve an RQoS rule from a downlink packet when there is an indication about an RQoS rule update (e.g., a change in RQI bit value). In other words, with HERQ processing, there is no requirement for the UE to check each downlink packet of a flow (e.g., parse packet by packet), thereby enhancing UE performance and saving baseband processor resources and power. Additionally, since RQoS rule is for uplink transmissions, if and/or when a RQoS rule is created before uplink packet transmissions, there is no effect on KPI (Key Performance Indicator).

Figure 8:
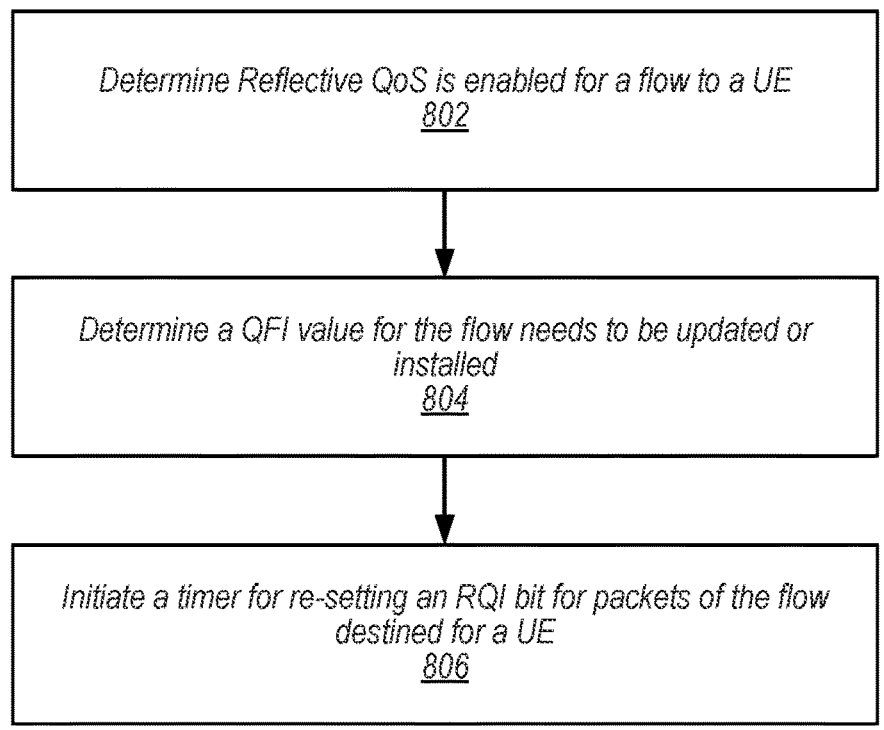
FIG. 8 illustrates a block diagram of an example of a method for using a backoff timer to reset an RQI bit for packets of a flow destined for a UE, according to some embodiments.
Figure 9:
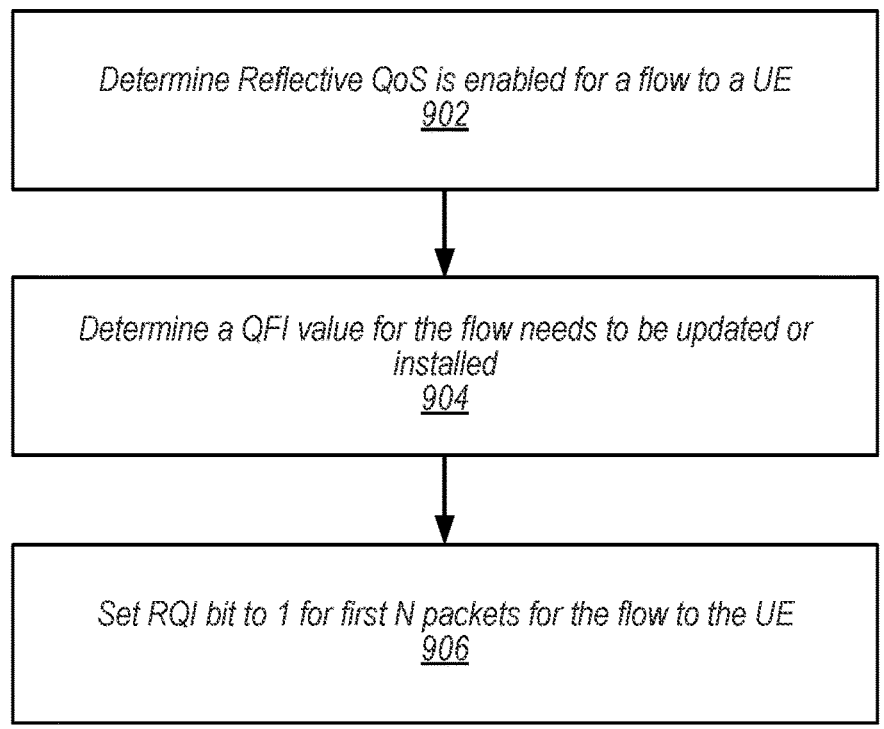
FIG. 9 illustrates a block diagram of an example of a method for using a counter-based reset of an RQI bit for packets of a flow destined for a UE, according to some embodiments.
Figure 10:
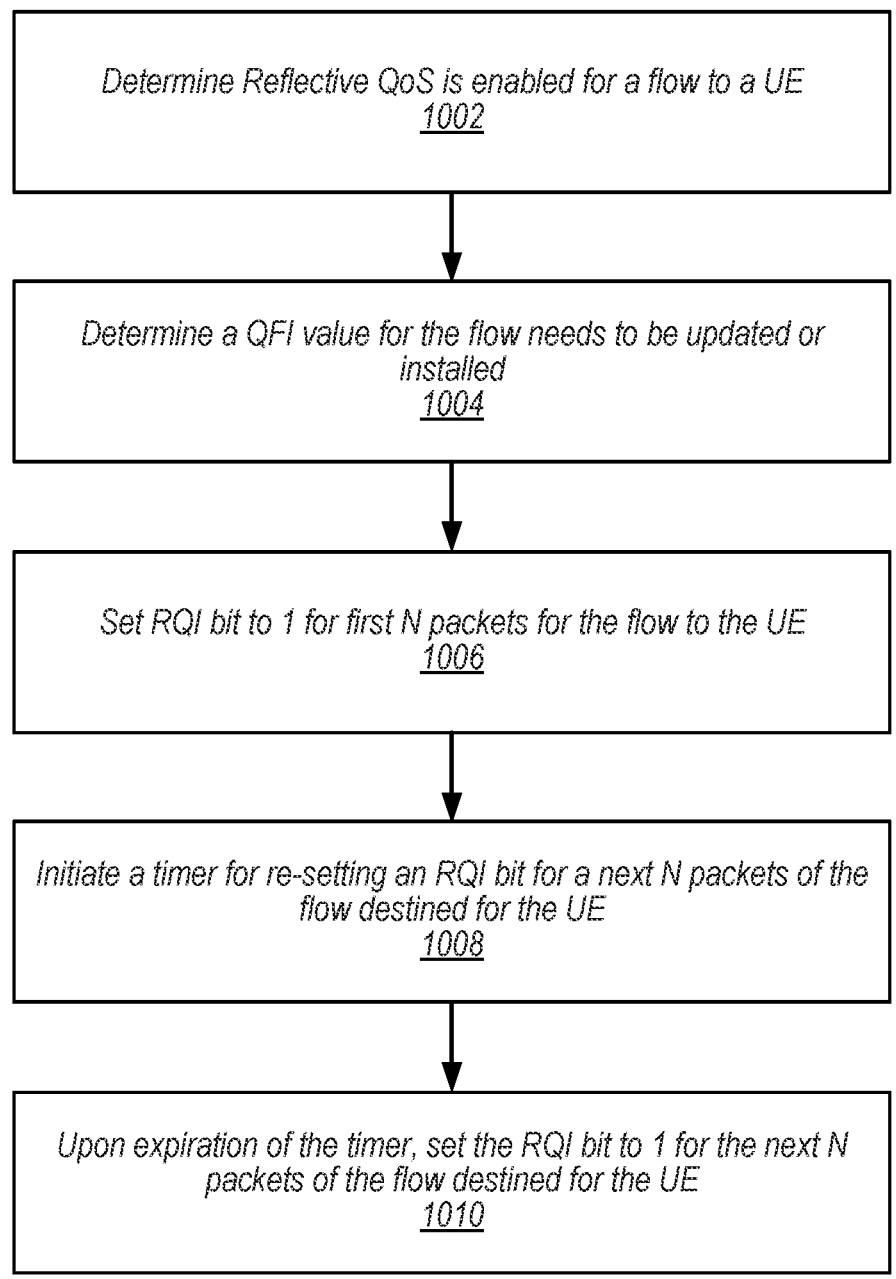
FIG. 10 illustrates a block diagram of an example of a method for using a backoff timer in conjunction with a counter to reset an RQI bit for packets of a flow destined for a UE, according to some embodiments.
Figure 11:
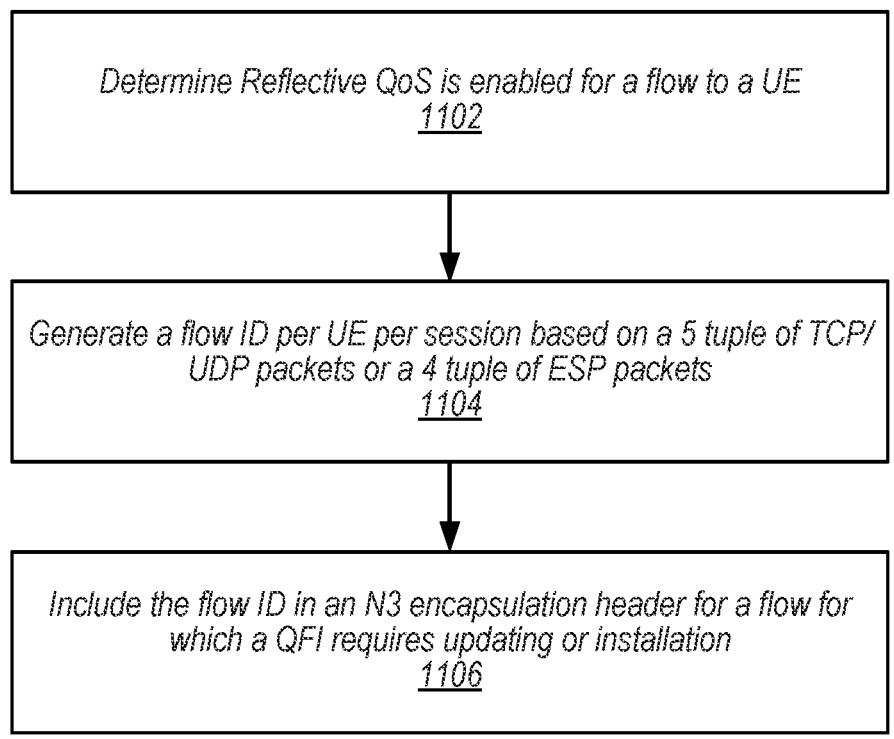
FIG. 11 illustrates a block diagram of an example of a method for generating a flow ID to include in an SDAP header destined for a UE, according to some embodiments.
Figure 12:
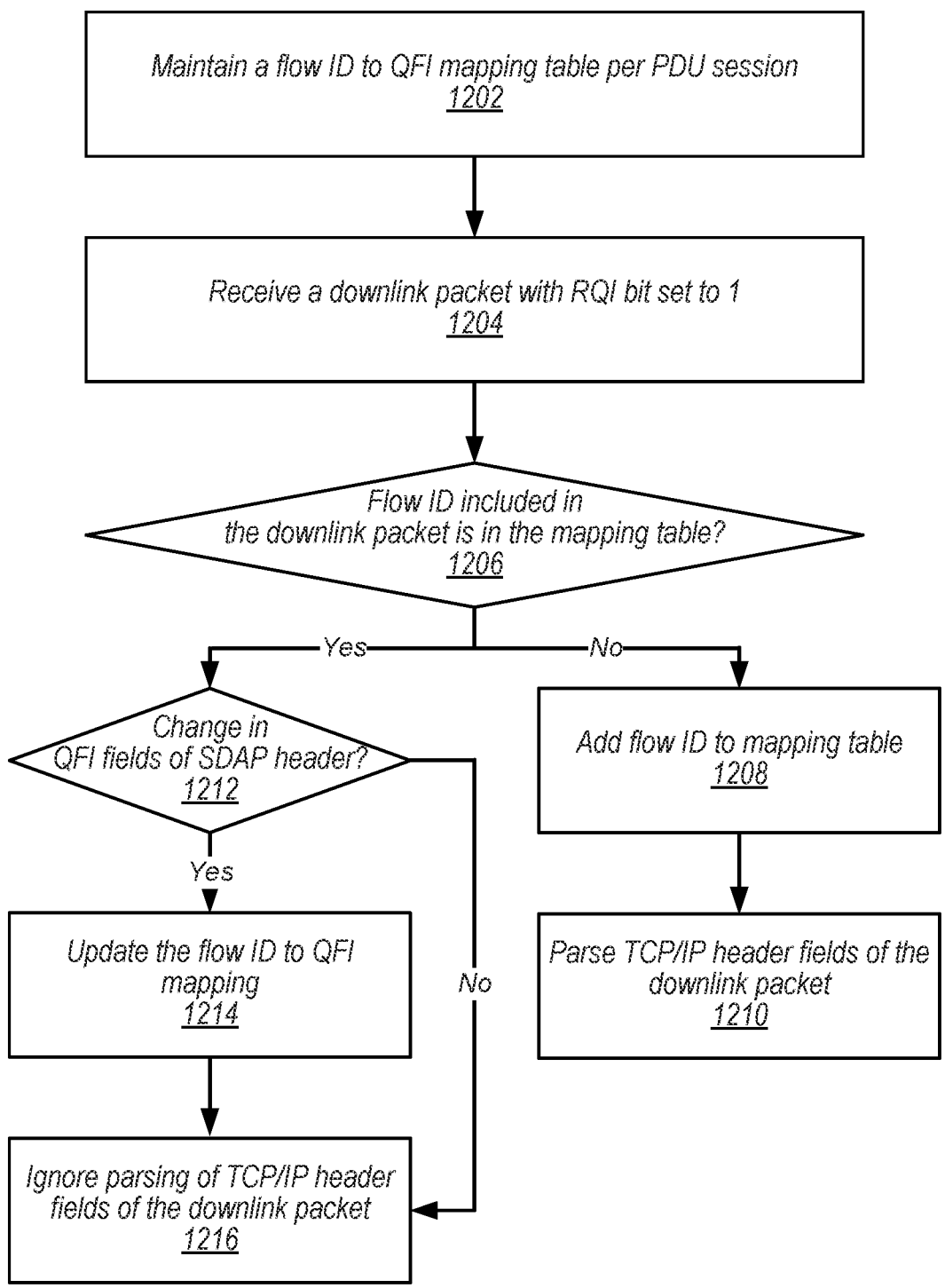
FIG. 12 illustrates a block diagram of an example of a method for using a flow ID to limit parsing of L3/L4 headers associated with RQoS, according to some embodiments.
Figure 13:
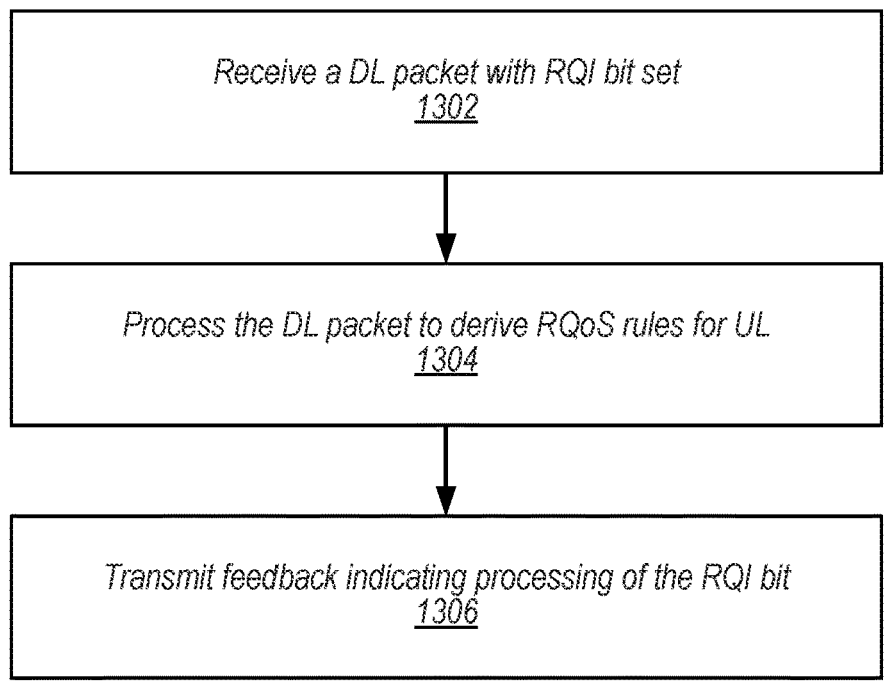
FIG. 13 illustrates a block diagram of an example of a method for a UE to send feedback regarding processing of an RQI bit to limit UE parsing of DL packets associated with RQoS, according to some embodiments.
Figure 14:
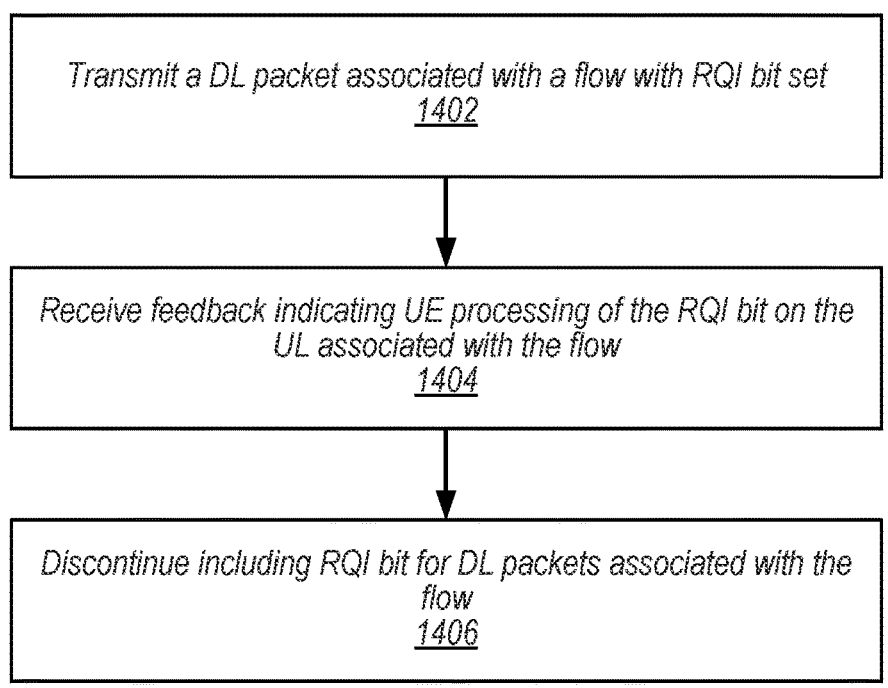
FIG. 14 illustrates a block diagram of an example of a method for a UPF to receive feedback regarding processing of an RQI bit to limit UE parsing of DL packets associated with RQoS, according to some embodiments.
Figure 15:
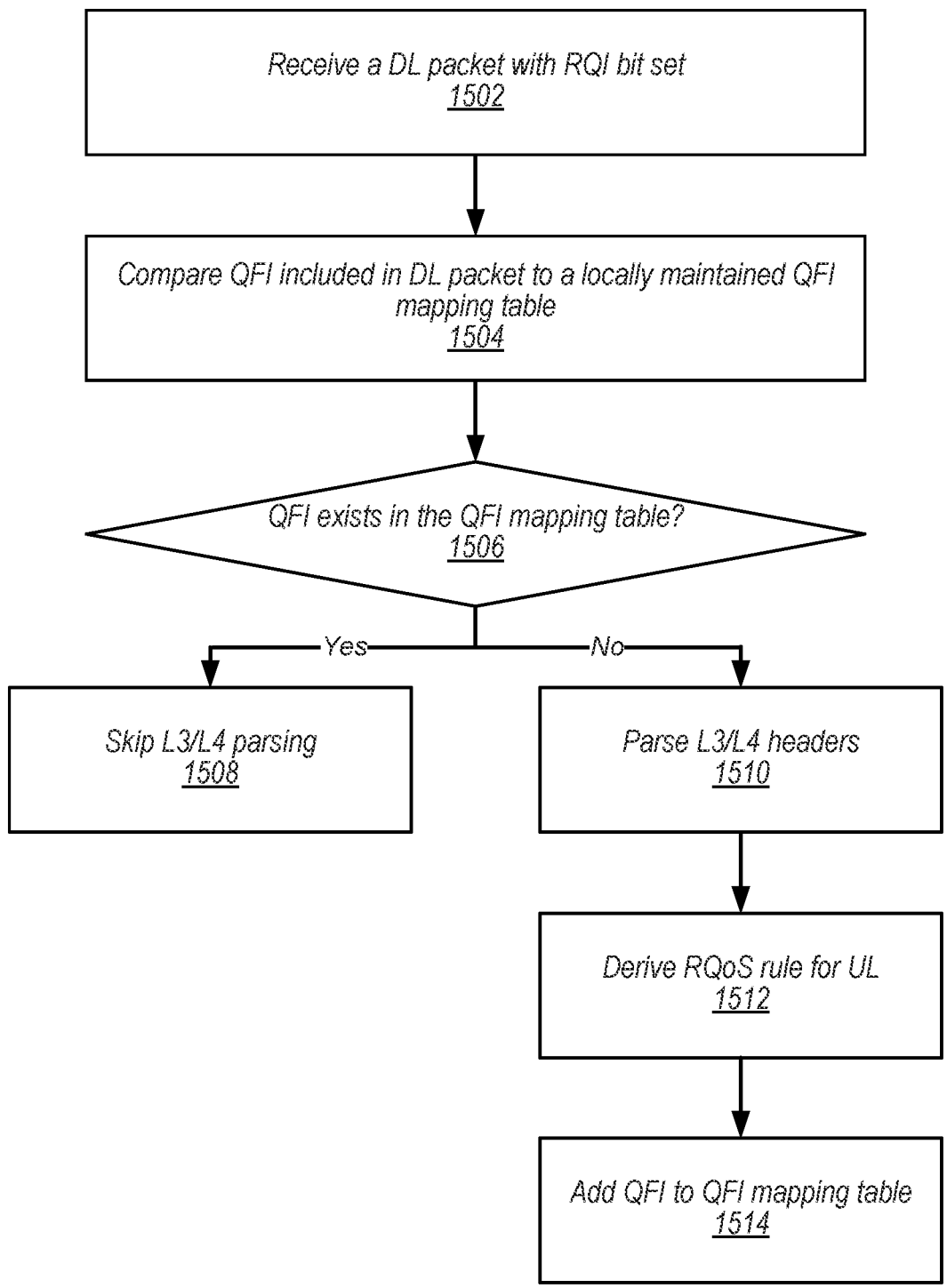
FIG. 15 illustrates a block diagram of an example of a method for a UE to maintain a QFI mapping table to limit UE parsing of downlink packets associated with RQoS, according to some embodiments.
Figure 16:
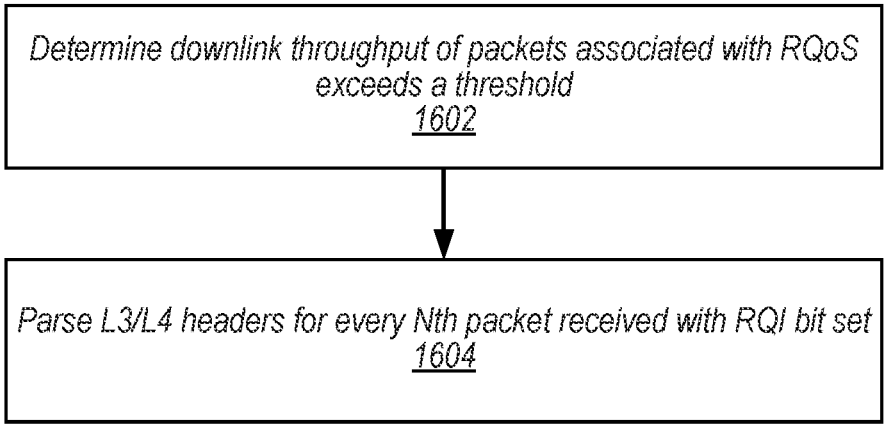
FIG. 16 illustrates a block diagram of an example of a method for a UE to randomly skip parsing of L3/L4 headers when downlink throughput exceeds a threshold, according to some embodiments.

FIGS. 8-22 illustrate block diagrams of examples of methods for reflective QoS enhancements, according to some embodiments. For example, FIGS. 8, 9 and 10 illustrate examples of methods for using a backoff timer and/or counter for limiting reset of an RQI bit for a flow destined for a UE, according to some embodiments. Additionally, FIGS. 11 and 12 illustrate examples of methods for using a flow ID to limit UE parsing of DL packets with RQI bit set to 1, according to some embodiments. Further, FIGS. 13 and 14 illustrate examples of methods for using feedback regarding UE processing of an RQI bit to limit UE parsing of DL packets associated with RQoS, according to some embodiments. In addition, FIG. 15 illustrates an example of a method for a UE to maintain a QFI mapping table to limit UE parsing of DL packets associated with RQoS, according to some embodiments. FIG. 16 illustrates an example of a method for a UE to randomly skip parsing of L3/L4 headers when downlink throughput exceeds a threshold, according to some embodiments. FIGS. 17, 18, 19, 20, 21, and 22 illustrate examples of methods for using NAS signaling to update and/or specify features associated with RQoS, according to some embodiments. Note that the methods shown in FIGS. 8-22 may be used in conjunction with one another along with any of the systems, methods, or devices shown in the Figures, among other devices.

Turning to FIG. 8, illustrated is a block diagram of an example of a method for using a backoff timer to reset an RQI bit for packets of a flow destined for a UE, according to some embodiments. As noted, the method shown in FIG. 8 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 802, a user plan function (UPF) of a core network, such as UPF 608, may determine that reflective QoS (RQoS) for a flow (e.g., an IP flow) destined for a UE, such as UE 106, is enabled.

At 804, the UPF may determine that a QFI value for the flow requires updating and/or installing.

At 806, the UPF may initiate a backoff timer prior to re-setting an RQI bit to "1" for packets of the flow destined for the UE. In some embodiments, a value of the backoff timer (e.g., a time duration of the backoff timer) may be provided by a session management function (SMF) of the core network, e.g., such as SMF 606. Thus, the UPF may receive a value of the backoff timer from the SMF. In some embodiments, the value of the backoff timer may be less than a value of a Reflective QoS (RQoS) inactivity timer (e.g., an RQ Timer). Note that the RQ timer may be provided to the UE by the network as part of PDU session establishment. For example, the backoff timer may be chosen (and/or determined) as "RQ Timer/k", where k may be greater than or equal to two. Thus, loss of a single packet marked with RQI would not result in an unintended expiry of the RQ Timer. Additionally, the value of the backoff timer may be greater than "a few seconds" which may implicitly set a lower limit for the RQ Timer. For example, assume that the core network would like a value of the backoff timer to be 5 seconds. Then, a minimum value of the RQ timer would be 10 seconds. In some embodiments, an example value for the backoff timer may be determined as MAX {X sec, MIN{RQ Timer/2, Y min}}. For example, X may be 5 and Y may be 1, at least in some embodiments.

Turning to FIG. 9, illustrated is a block diagram of an example of a method for using a counter-based reset of an RQI bit for packets of a flow destined for a UE, according to some embodiments. As noted, the method shown in FIG. 9 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 902, a user plan function (UPF) of a core network, such as UPF 608, may determine that reflective QoS (RQoS) for a flow (e.g., an IP flow) destined for a UE, such as UE 106, is enabled.

At 904, the UPF may determine that a QFI value for the flow requires updating and/or installing.

At 906, the UPF may set an RQI bit to 1 for a first N packets of the flow sent to the UE. In some embodiments, the value of N may be greater than or equal to 1. In some embodiments, a value for N may be provided by a session management function (SMF) of the core network, e.g., such as SMF 606. Thus, the UPF may receive a value for N from the SMF. In some embodiments, the value of N may not exceed a network specified value, e.g., such as 10 or 20, among other values. In some embodiments, such a mechanism may be implemented with a backoff timer as described herein. For example, the UPF may set an RQI bit to 1 for a first N packets after expiration of the backoff timer.

For example, FIG. 10 illustrates a block diagram of an example of a method for using a backoff timer in conjunction with a counter to reset an RQI bit for packets of a flow destined for a UE, according to some embodiments. As noted, the method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, a user plan function (UPF) of a core network, such as UPF 608, may determine that reflective QoS (RQoS) for a flow (e.g., an IP flow) destined for a UE, such as UE 106, is enabled.

At 1004, the UPF may determine that a QFI value for the flow requires updating and/or installing.

At 1006, the UPF may set an RQI bit to 1 for a first N packets of the flow sent to the UE. In some embodiments, the value of N may be greater than or equal to 1. In some embodiments, a value for N may be provided by a session management function (SMF) of the core network, e.g., such as SMF 606. Thus, the UPF may receive a value for N from the SMF. In some embodiments, the value of N may not exceed a network specified value, e.g., such as 10 or 20, among other values.

At 1008, the UPF may initiate a backoff timer after re-setting an RQI bit to "1" for first N packets of the flow destined for the UE. In some embodiments, a value of the backoff timer (e.g., a time duration of the backoff timer) may be provided by a session management function (SMF) of the core network, e.g., such as SMF 606. Thus, the UPF may receive a value of the backoff timer from the SMF. In some embodiments, the value of the backoff timer may be less than a value of a Reflective QoS (RQoS) inactivity timer (e.g., an RQ Timer). Note that the RQ timer may be provided to the UE by the network as part of PDU session establishment. For example, the backoff timer may be chosen (and/or determined) as "RQ Timer/k", wherein k may be greater than or equal to two. Thus, loss of a single packet marked with RQI would not result in an unintended expiry of the RQ Timer. Additionally, the value of the backoff timer may be greater than "a few seconds" which may implicitly set a lower limit for the RQ Timer. For example, assume that the core network would like a value of the backoff timer to be 5 seconds. Then, a minimum value of the RQ timer would be 10 seconds. In some embodiments, an example value for the backoff timer may be determined as MAX {X sec, MIN{RQ Timer/2, Y min}}. For example, X may be 5 and Y may be 1, at least in some embodiments.

At 1010, upon expiration of the backoff time, the UPF may set the RQI bit to "1" for the next N packets of the flow destined for the UE.

Turning to FIGS. 11 and 12, FIG. 11 illustrates a block diagram of an example of a method for generating a flow ID to include in an SDAP header destined for a UE, according to some embodiments. As noted, the method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a user plan function (UPF) of a core network, such as UPF 608, may determine that reflective QoS (RQoS) for a flow (e.g., an IP flow) destined for a UE, such as UE 106, is enabled.

At 1104, the UPF may generate a flow ID per UE per PDU session based on a 5 tuple (e.g., source and destination IP address, source and destination port number, and next_header field in IP header) of TCP/UDP packets or a 4 tuple (e.g., source and destination IP address, next_header, and security parameters index (SPI) fields) of ESP packets. The flow ID field may be limited to 8 bits, at least in some embodiments. Note that in such embodiments, such a limitation would allow up to 255 active flows per UE.

At 1106, the UPF may include the flow ID in an N3 encapsulation header of a packet destined to the UE for a flow for which a QFI requires updating or installation. Thus, the flow ID may then be added (e.g., by another entity of the network, e.g. a base station such as base station 102) to an SDAP header on downlink to the UE. In some embodiments, the size of the SDAP header may be increased to 2 bytes to accommodate the flow ID.

Turning to FIG. 12, illustrated is a block diagram of an example of a method for using a flow ID to limit parsing of L3/L4 headers associated with RQoS, according to some embodiments. As noted, the method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as UE 106, may maintain a flow ID to QFI mapping table per PDU session. Note that the flow ID may be generated by a UPF, such as UPF 608, as described in reference to FIG. 11. Thus, the flow ID may be per UE per PDU session and may be based on a 5 tuple (e.g., source and destination IP address, source and destination port number, and next_header) of TCP/UDP packets or a 4 tuple (e.g., source and destination IP address, next_header, and SPI fields) of ESP packets received by the UE. The flow ID field may be limited to 8 bits, at least in some embodiments. Note that in such embodiments, such a limitation would allow up to 255 active flows per UE.

At 1204, the UE may receive a downlink packet with RQI bit set to 1. The downlink packet may include a flow ID.

At 1206, the UE may determine whether the flow ID included in the downlink packet is in the QFI mapping table. In other words, the UE may search the QFI mapping table for the flow ID included in the downlink packet.

At 1208, in response to determining that the flow ID is not in the QFI mapping table, the UE may add the flow ID to the QFI mapping table. Additionally, at 1210, the UE may parse a layer 4 (L4) header field and a layer 3 (L3) header field of the downlink packet. Note that L4 header field may be a TCP/UDP/ESP header and L3 header field may be an IP header field.

Alternatively, at 1212, in response to determining that the flow ID is in the QFI mapping table, the UE may determine whether there is a change in QFI fields of an SDAP header of the downlink packet. At 1214, in response to determining that there is a change in QFI fields of an SDAP header of the downlink packet, the UE may update the flow ID to QFI mapping, and, at 1216, the UE may ignore parsing of the L3/L4 header fields of the downlink packet. Alternatively, in response to determining that there is no change in QFI fields of an SDAP header of the downlink packet, the UE may, at 1216, ignore parsing of the L3/L4 header fields of the downlink packet.

In some embodiments, in order to ensure a UE does not maintain old (e.g., stale and/or expired) flow IDs, the UE may delete flow IDs from the QFI mapping table when an RQ timer expires. Additionally and/or alternatively, in some embodiments, in order to ensure a UE does not maintain old (e.g., stale and/or expired) flow IDs, the UE may delete flow IDs from the QFI mapping table at the end of a radio resource control (RRC) connection (e.g., when the UE transitions from an RRC connected state to an RRC idle state).

Turning to FIGS. 13 and 14, FIG. 13 illustrates a block diagram of an example of a method for a UE to send feedback regarding processing of an RQI bit to limit UE parsing of DL packets associated with RQoS, according to some embodiments. As noted, the method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may receive a downlink packet with RQI bit set to a value of 1.

At 1304, the UE may process the downlink packet to derive one or more RQoS rules for uplink transmissions.

At 1306, the UE may transmit feedback indicating and/or regarding processing of the RQI bit, e.g., to indicate derivation of the one or more RQoS rules for uplink transmissions. In some embodiments. the feedback may be an end marker PDU on the uplink. The end marker PDU may include a zero-payload length packet along with reference to L3/L4 headers. An example of zero payload length packet may be a TCP acknowledge (ACK) packet. The L3/L4 headers may match the derived RQoS rules on the uplink. The UE may include an SDAP header and signal the SDAP header as a control PDU. The control PDU may include a QFI which was received on the downlink for the flow associated with the received downlink packet.

Turning to FIG. 14, illustrated is a block diagram of an example of a method for a UPF to receive feedback regarding processing of an RQI bit to limit UE parsing of DL packets associated with RQoS, according to some embodiments. As noted, the method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a UPF, such as UPF 608, may transmit a downlink packet with RQI bit set to a value of 1.

At 1404, the UPF may receive feedback indicating and/or regarding processing of the RQI bit, e.g., to indicate derivation of the one or more RQoS rules for uplink transmissions. In some embodiments. the feedback may be an end marker PDU on the uplink. The end marker PDU may include a zero-payload length packet along with reference to L3/L4 headers. The L3/L4 headers may match the derived RQoS rules on the uplink. The UE may include an SDAP header and signal the SDAP header as a control PDU. The control PDU may include a QFI which was received on the downlink for the flow associated with the received downlink packet.

At 1406, after confirming that the L3/L4 headers and the QFI value match an uplink packet data report received from an SMF, such as SMF 606, for a flow (e.g., service data flow (SDF) associated with the downlink packet (e.g., to confirm that the UE has applied the one or more RQoS rules for the uplink), the UPF may discontinue including the RQI bit for subsequent packets of the flow on the downlink. In some embodiments, the UPF may transparently forward the packet on the uplink to the destination IP address indicated in an IP header field of the SDAP header. In some embodiments, the UPF may also implement a backoff timer and/or counter as described above in reference to FIGS. 8, 9, and 10.

Turning to FIG. 15, illustrated is a block diagram of an example of a method for a UE to maintain a QFI mapping table to limit UE parsing of downlink packets associated with RQoS, according to some embodiments. As noted, the method shown in FIG. 15 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a UE, such as UE 106, may receive a downlink packet with RQI bit set to a value of 1.

At 1504, the UE may compare a QFI value included in the downlink packet with a locally maintained QFI mapping table.

At 1506, the UE may confirm whether the QFI value included in the downlink packet exists in the QFI mapping table. Note that no more than one IP flow may be mapped to the QFI value, per PDU session in this method.

At 1508, in response to determining that the QFI value is included in the QFI mapping table, the UE may skip parsing of L3/L4 headers included in the downlink packet.

Alternatively, at 1510, in response to determining that the QFI value is not included in the QFI mapping table, the UE may parse the L3/L4 headers included in the downlink packet. Further, at 1512 the UE may derive one or more RQoS rules for uplink transmissions. Additionally, at 1514, the UE may add the QFI value to the QFI mapping table.

In some embodiments, when consecutive downlink packets on a specific dedicated resource bearer (DRB) have an RDI bit set, so long as a QFI is part of a QFI mapping table, the UE may ignore sending the RDI end marker control PDU on the uplink.

Turning to FIG. 16, illustrated is a block diagram of an example of a method for a UE to randomly skip parsing of L3/L4 headers when downlink throughput exceeds a threshold, according to some embodiments. As noted, the method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1602, a UE, such as UE 106, may determine that a throughput for downlink packets associated with an RQoS exceeds a threshold. In other words, the UE may determine that throughput of downlink packets of a flow with an RQI bit set to a value of 1 exceeds a threshold. In some embodiments the threshold may be within a range of 200 to 1000 megabytes per second. In some embodiments, the threshold may depend, at least in part, on a power state of a UE and/or a power level of a battery powering the UE. In some embodiments, the threshold may depend, at least in part, on a thermal load of the UE.

At 1604, in response to determining that the throughput exceeds the threshold, the UE may parse L3/L4 headers every Nth downlink packet of the flow that is received with an RQI bit set to a value of 1. Thus, the UE may parse L3/L4 headers of a downlink packet of the flow with RQI bit set to a value of 1 and then skip parsing of a next N−1 downlink packets of the flow with RQI bit set to a value of 1. In some embodiments, N, may be a number ranging between 10 and 100, e.g., depending on factors such as a value of the threshold. For example, a value of N may increase as a value of the threshold increases and/or a value of N may decrease as a value of the threshold decreases.

Figure 17:
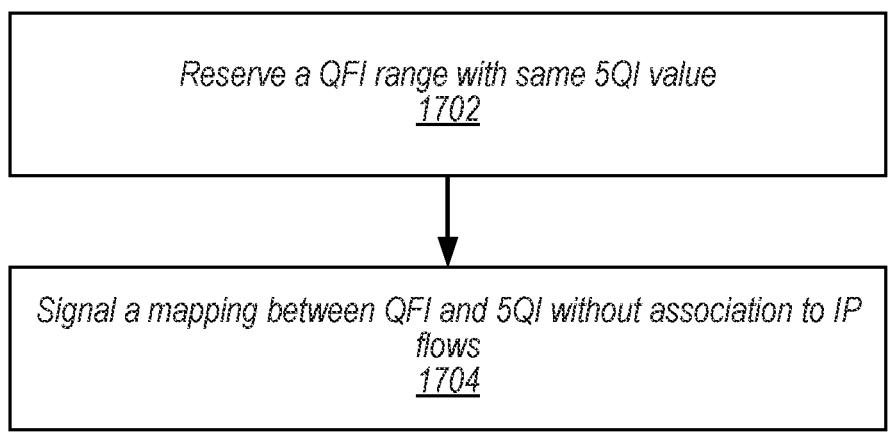
FIG. 17 illustrates a block diagram of an example of a method for a UPF to specify and signal a QFI range to a UE, according to some embodiments.

As noted above, FIGS. 17, 18, 19, 20, 21, and 22 illustrate block diagrams of examples of methods for using network access stratum (NAS) signaling to update and/or specify features associated with RQoS, according to some embodiments. Turning to FIG. 17, illustrated is a block diagram of an example of a method for a UPF to specify and signal a QFI range to a UE, according to some embodiments. As noted, the method shown in FIG. 17 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, an SMF, such as SMF 606, may reserve a QFI range with a same 5G Standardized QoS Identifier (5QI). In some embodiments, when RQoS needs to be enabled for multiple flows for a UE, such as UE 106, at the same time for a PDU session the SMF may ensure that a QFI allocated for each simultaneous IP flow is a unique QFI. In other words, for the UE, two IP flows at the same time may not have overlapping QFI values. In some embodiments, the SMF may reserve a QFI range up to sixteen which may have the exact same QoS characteristics, e.g., the same 5QI value. Thus, even if multiple IP flows have different QFI values, the network may allow the multiple IP flows to have the same QoS profile.

At 1704, the SMF may signal a mapping between QFI values and 5QI without association to an IP flow to a UE, such as UE 106. In other words, the mapping may include a QoS flow description information element without associated QoS rule. In some embodiments, the SMF may signal the mapping via NAS signaling during a PDU session establishment procedure. Note that in cases in which more that 16 active flows are present for the same UE with have RQoS present, a UPF, such as UPF 608, may trigger additional optimizations, e.g., such as described above in reference to FIGS. 8, 9, and 10.

Figure 18:
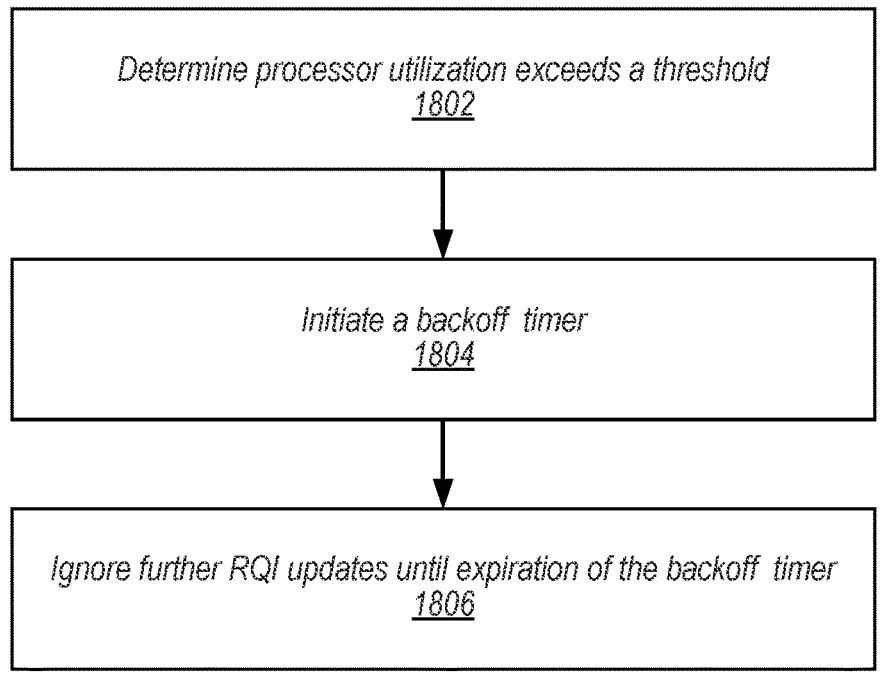
FIG. 18 illustrates a block diagram of an example of a method for a UE to limit downlink header parsing associated with RQoS based on processor utilization, according to some embodiments.

Turning to FIG. 18, illustrated is a block diagram of an example of a method for a UE to limit downlink header parsing associated with RQoS based on processor utilization, according to some embodiments. As noted, the method shown in FIG. 18 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1802, a UE, such as UE 106, may determine that processor utilization associated with parsing downlink packet headers associated with RQoS has exceeded a threshold. In some embodiments, the threshold may range between 50 and 90 percent processor utilization. In some embodiments, the threshold may depend, at least in part, on a power state of a UE and/or a power level of a battery powering the UE. In some embodiments, the threshold may depend, at least in part, on a thermal load of the UE.

At 1804, the UE may initiate a backoff timer, e.g., in response to the processor utilization exceeding the threshold. In some embodiments, the backoff timer may depend, at least in part, on a power state of a UE and/or a power level of a battery powering the UE. In some embodiments, the backoff timer may depend, at least in part, on a thermal load of the UE.

At 1806, the UE may ignore further RQI updates received in downlink packets until expiration of the backoff timer. In other words, the UE may skip parsing of downlink packets associated with RQoS until expiration of the backoff timer.

Figure 19:
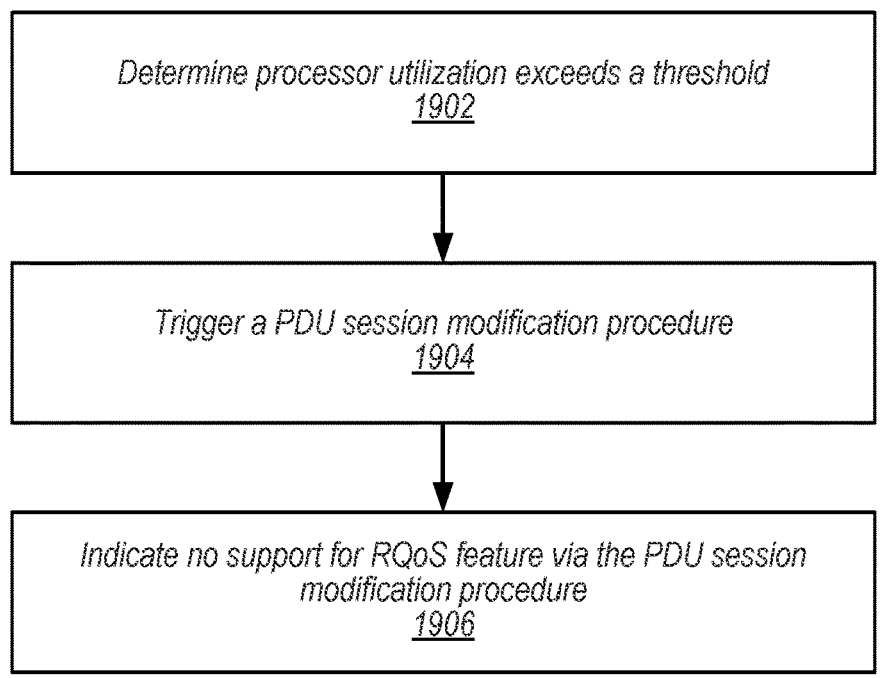
FIG. 19 illustrates a block diagram of another example of a method for a UE to limit downlink header parsing associated with RQoS based on processor utilization, according to some embodiments.

Turning to FIG. 19, illustrated is a block diagram of another example of a method for a UE to limit downlink header parsing associated with RQoS based on processor utilization, according to some embodiments. As noted, the method shown in FIG. 19 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1902, a UE, such as UE 106, may determine that processor utilization associated with parsing downlink packet headers associated with RQoS has exceeded a threshold. In some embodiments, the threshold may range between 50 and 90 percent processor utilization. In some embodiments, the threshold may depend, at least in part, on a power state of a UE and/or a power level of a battery powering the UE. In some embodiments, the threshold may depend, at least in part, on a thermal load of the UE.

At 1904, the UE may trigger a PDU session modification procedure, e.g., in response to the processor utilization exceeding the threshold.

At 1906, the UE may, as part of the PDU session modification procedure, indicate no support for RQoS feature. In some embodiments, while disabling the RQoS feature via the PDU session modification procedure, the UE may include a set of packet filters which were configured via RQoS, e.g., as part of an uplink PDU session modification request message. In some embodiments, when an SMF, such as SMF 608, receives these packet filters, the SMF may continue to configure a UPF, such as UPF 606, for downlink and the UE for uplink via PDU Session Modification procedure on the downlink, e.g., to ensure that the set of packet filters are associated with the same QFI requested by the UE, thereby ensuring that user experience does not degrade in any way due to revocation of RQoS.

Figure 20:
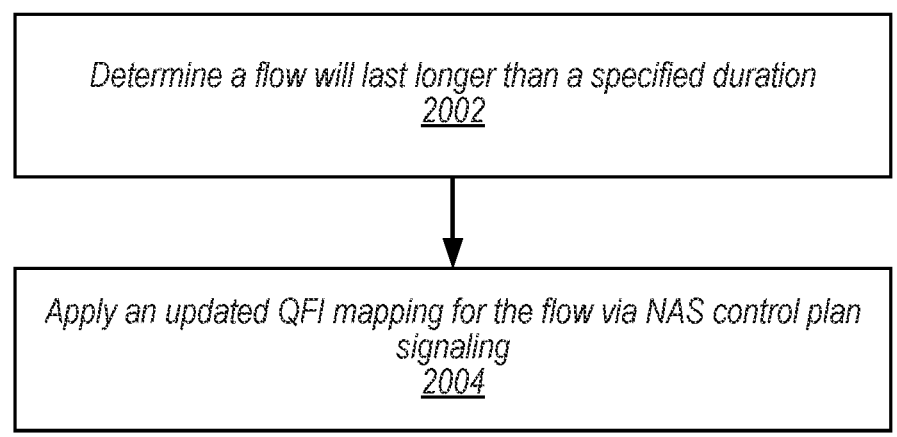
FIG. 20 illustrates a block diagram an example of a method for updating a QFI mapping for a flow via NAS signaling, according to some embodiments.

Turning to FIG. 20, illustrated is a block diagram an example of a method for updating a QFI mapping for a flow via NAS signaling, according to some embodiments. As noted, the method shown in FIG. 20 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2020, a network entity may determine that a flow will last longer than a specified duration. In some embodiments, the specified duration may be on the order of minutes. In some embodiments, a duration of the flow may be determined based on Differentiated Services Code Point (DSCP)/Type of Service (TOS) marking of an incoming IP packet. In some embodiments, a duration of the flow may be determined based on a 5QI value of an incoming IP packet.

At 2022, the network entity may apply an updated QFI mapping for the flow via NAS control plane signaling with a UE, such as UE 106. In some embodiments, the NAS control plane signaling may be triggered by a PDU session modification procedure.

Figure 21:
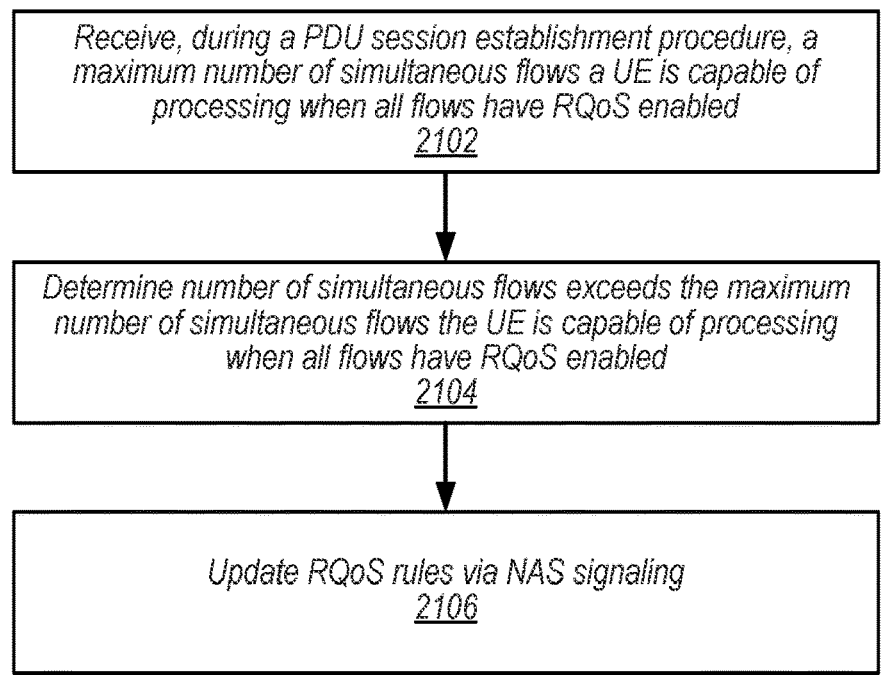
FIG. 21 illustrates a block diagram of an example of a method for a UE to indicate a maximum number of simultaneous flows the UE is capable of processing when an RQoS feature is enabled, according to some embodiments.
Figure 22:
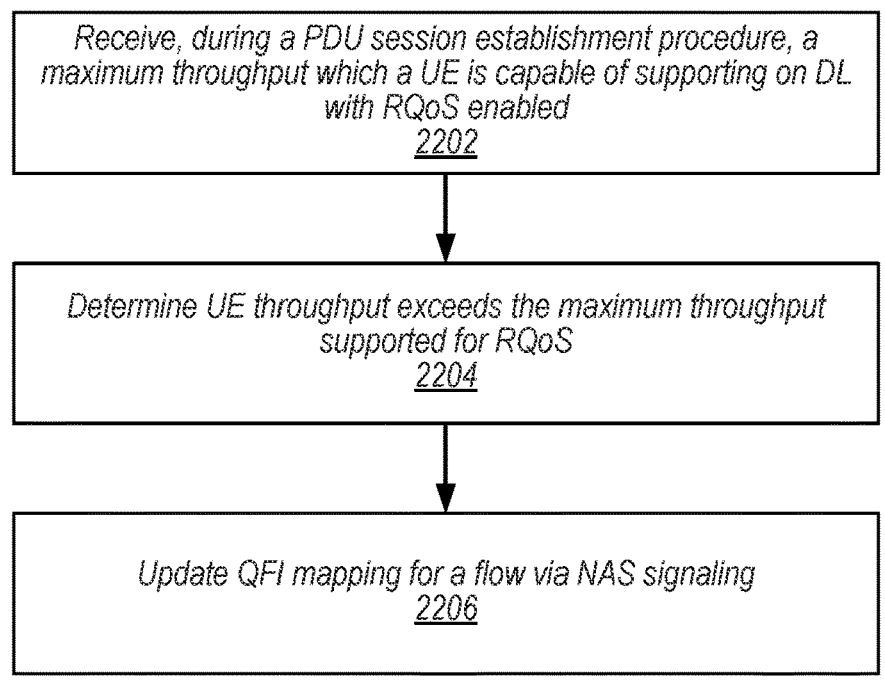
FIG. 22 illustrates a block diagram of an example of a method for a UE to indicate a maximum downlink throughput the UE is capable of supporting when an RQoS feature is enabled, according to some embodiments.

Turning to FIGS. 21 and 22, illustrated are block diagrams of examples of methods for a UE to indicate capabilities associated with RQoS features, according to some embodiments. For example, FIG. 21 illustrates a block diagram of an example of a method for a UE to indicate a maximum number of simultaneous flows the UE is capable of processing when an RQoS feature is enabled, according to some embodiments. As noted, the method shown in FIG. 21 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2102, an SMF, such as SMF 606, may receive, from a UE, such as UE 106, an indication of a maximum number of simultaneous flows (e.g., IP flows) the UE is capable of processing when all flows have RQoS enabled. In some embodiments, the indication may be received during a PDU session establishment procedure.

At 2104, the SMF may determine that a number of simultaneous flows has exceeded the maximum number of simultaneous flows the UE is capable of processing when all flows have RQoS enabled.

At 2106, the SMF may update RQoS rules, e.g., via NAS signaling with the UE. In other words, the SMF may use NAS signaling to indicate and/or update RQoS rules at the UE.

Turning to FIG. 22, FIG. 22 illustrates a block diagram of an example of a method for a UE to indicate a maximum downlink throughput the UE is capable of supporting when an RQoS feature is enabled, according to some embodiments. As noted, the method shown in FIG. 22 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2102, an SMF, such as SMF 606, may receive, from a UE, such as UE 106, an indication of a maximum downlink throughput the UE is capable of supporting when all flows have RQoS enabled. In some embodiments, the indication may be received during a PDU session establishment procedure.

At 2104, the SMF may determine that downlink throughput of the UE has exceeded the maximum downlink throughput the UE is capable of supporting when all flows have RQoS enabled.

At 2106, the SMF may update one or more QFI mappings for flows to the UE, e.g., via NAS signaling with the UE. In other words, the SMF may use NAS signaling to indicate and/or update one or more QFI mappings at the UE.

Figure 23:
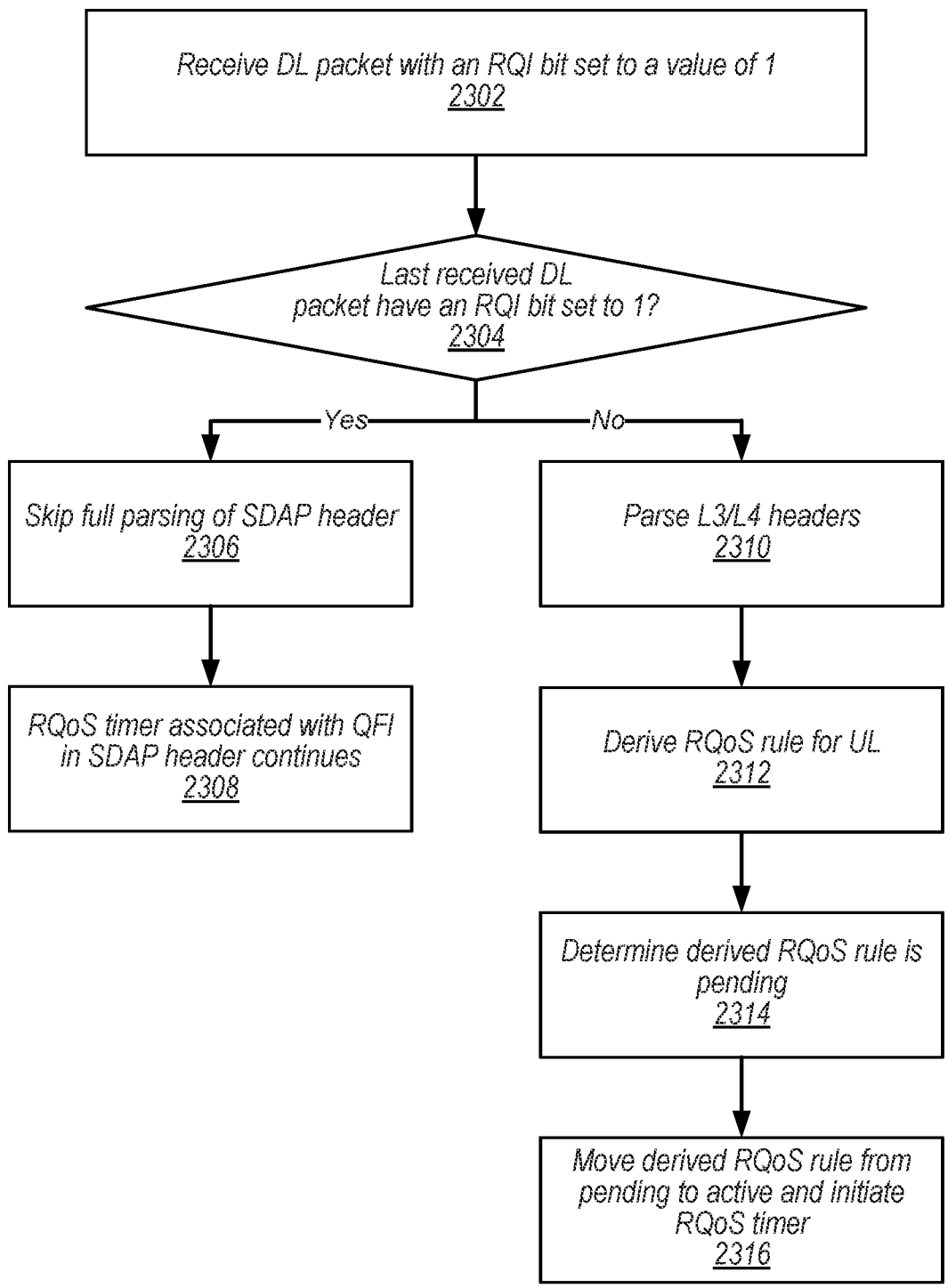
FIG. 23 illustrates a block diagram of an example of a method for HERQ processing when a received downlink packet has an RQI bit set to a value of 1, according to some embodiments.
Figure 24:
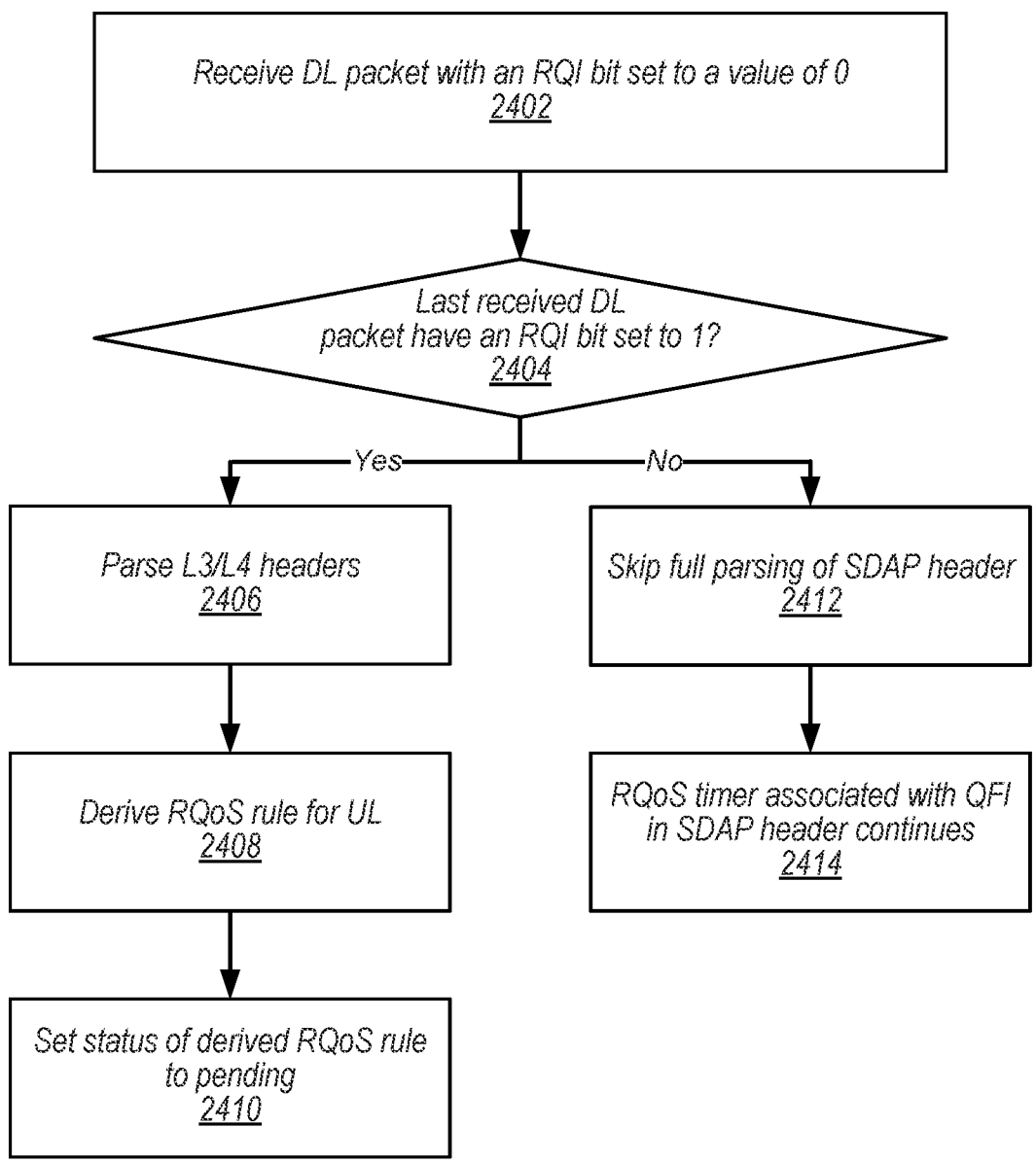
FIG. 24 illustrates a block diagram of an example of a method for HERQ processing when a received downlink packet has an RQI bit set to a value of 0, according to some embodiments.
Figure 25:
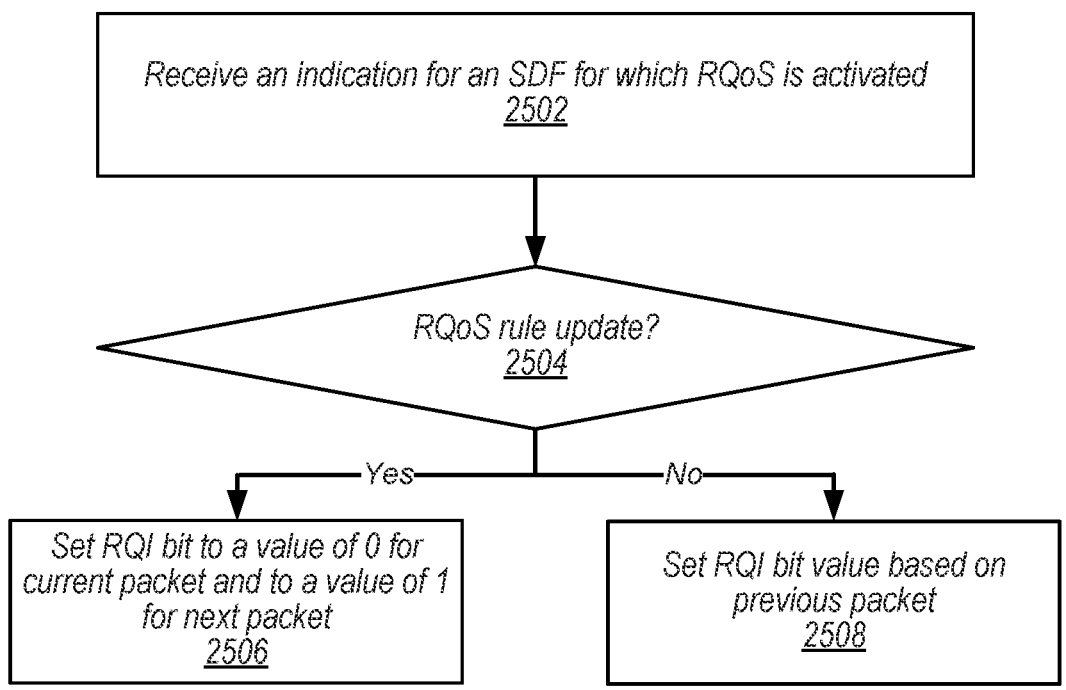
FIG. 25 illustrates a block diagram of an example of a method for determining an RQI bit value for HERQ processing, according to some embodiments.

FIGS. 23, 24, and 25 illustrate block diagrams of examples of methods for HERQ processing, according to some embodiments. In particular, FIGS. 23 and 24 illustrate block diagrams of examples of methods for UE side HERQ processing, according to some embodiments and FIG. 25 illustrates a block diagram of an example of a method for network side HERQ processing, according to some embodiments. Note that the methods shown in FIGS. 23-25 may be used in conjunction with one another along with any of the methods described above in reference to FIGS. 8-22 as well as any of the other systems, methods, or devices shown in the Figures, among other devices.

Turning to FIG. 23, illustrated is a block diagram of an example of a method for HERQ processing when a received downlink packet has an RQI bit set to a value of 1, according to some embodiments. As noted, the method shown in FIG. 23 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2302, a UE, such as UE 106, may receive a downlink packet with an RQI bit set to a value of 1. The downlink packet may be associated with a flow (e.g., with an SDF/IP flow associated with a particular QFI value).

At 2304, the UE may determine whether a last received downlink packet in the flow had an RQI bit set to a value of 1.

At 2306, in response to determining that the last received downlink packet in the flow had an RQI bit set to a value of 1, the UE may skip full parsing of an SDAP header included in the downlink packet. Additionally, at 2308, an RQoS timer associated with the flow (e.g., associated with the particular QFI value included in the SDAP header) may continue.

Alternatively, at 2310, in response to determining that the last received downlink packet in the flow did not have an RQI bit set to a value of 1 (e.g., indicating a change in RQI bit value from 0 to 1), the UE may parse L3/L4 headers (e.g., parse the SDAP header) of the downlink packet. Additionally, at 2312, the UE may derive the RQoS rule for uplink included in the L3/L4 headers and, at 2314, determine that the RQoS rule is pending (e.g., previously derived but not active). Then, at 2316, the UE may move the derived RQoS rule from pending (e.g., from a pending and/or inactive state) to active (e.g., to an active and/or in use state) and initiate an RQoS timer associated with the flow (e.g., associated with the particular QFI value).

Turning to FIG. 24, illustrated is a block diagram of an example of a method for HERQ processing when a received downlink packet has an RQI bit set to a value of 0, according to some embodiments. As noted, the method shown in FIG. 24 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2402, a UE, such as UE 106, may receive a downlink packet with an RQI bit set to a value of 0. The downlink packet may be associated with a flow (e.g., with an SDF/IP flow associated with a particular QFI value).

At 2404, the UE may determine whether a last received downlink packet in the flow had an RQI bit set to a value of 1.

At 2406, in response to determining that the last received downlink packet in the flow did not have an RQI bit set to a value of 1 (e.g., indicating a change in RQI bit value from 1 to 0), the UE may parse L3/L4 headers (e.g., parse the SDAP header) of the downlink packet. Additionally, at 2408, the UE may derive the RQoS rule for uplink included in the L3/L4 headers and, at 2410, the UE may set a status of the RQoS rule to pending (e.g., previously derived but not active).

Alternatively, at 2412, in response to determining that the last received downlink packet in the flow did not have an RQI bit set to a value of 1, the UE may skip full parsing of an SDAP header included in the downlink packet. Additionally, at 2414, an RQoS time associated with the flow (e.g., associated with the particular QFI value included in the SDAP header) may continue.

Turning to FIG. 25, illustrated is a block diagram of an example of a method for determining an RQI bit value for HERQ processing, according to some embodiments. As noted, the method shown in FIG. 25 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2502, a UPF, such as UPF 608, may receive an indication for a flow (e.g., for an SDF and/or IP flow) for which RQoS is activated. The flow may be associated with a particular QFI value and destined for a UE, such as UE 106.

At 2504, the UPF may determine whether there is an RQoS rule update associated with the flow (e.g., associated with the particular QFI value).

At 2506, in response to determining that there is an RQoS rule update associated with the flow, the UPF may set an RQI bit to a value of 0 for a current packet (e.g., packet N) and then set an RQI bit to a value of 1 for a next packet (e.g., packet N+1) of the flow.

Alternatively, at 2508, if there is no RQoS rule update, the UPF determine the RQI bit value based on a previous packet. For example, if the previous packet had an RQI bit value of 0, the UPF may set the RQI bit value of a current packet to 0, e.g., indicating no change in RQoS rules. Similarly, if the previous packet had an RQI bit value of 1, the UPF may set the RQI bit value of a current packet to 1, e.g., indicating no change in RQoS rules.

Figure 26:
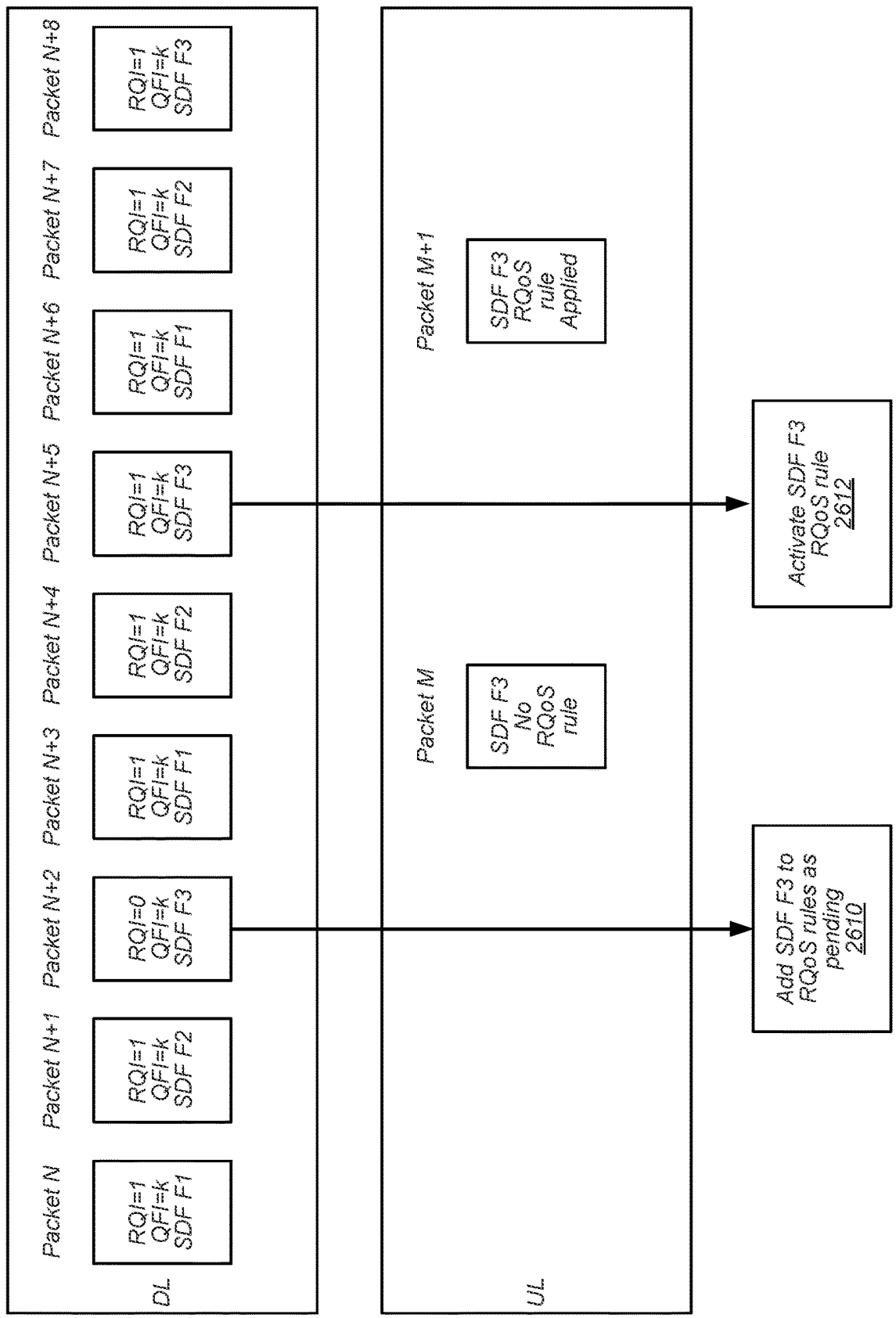
FIG. 26 illustrates an example of multiple SDFs in an RQoS flow (e.g., multiple SDFs associated with a particular QFI value) while using HERQ processing, according to some embodiments.
Figure 27:
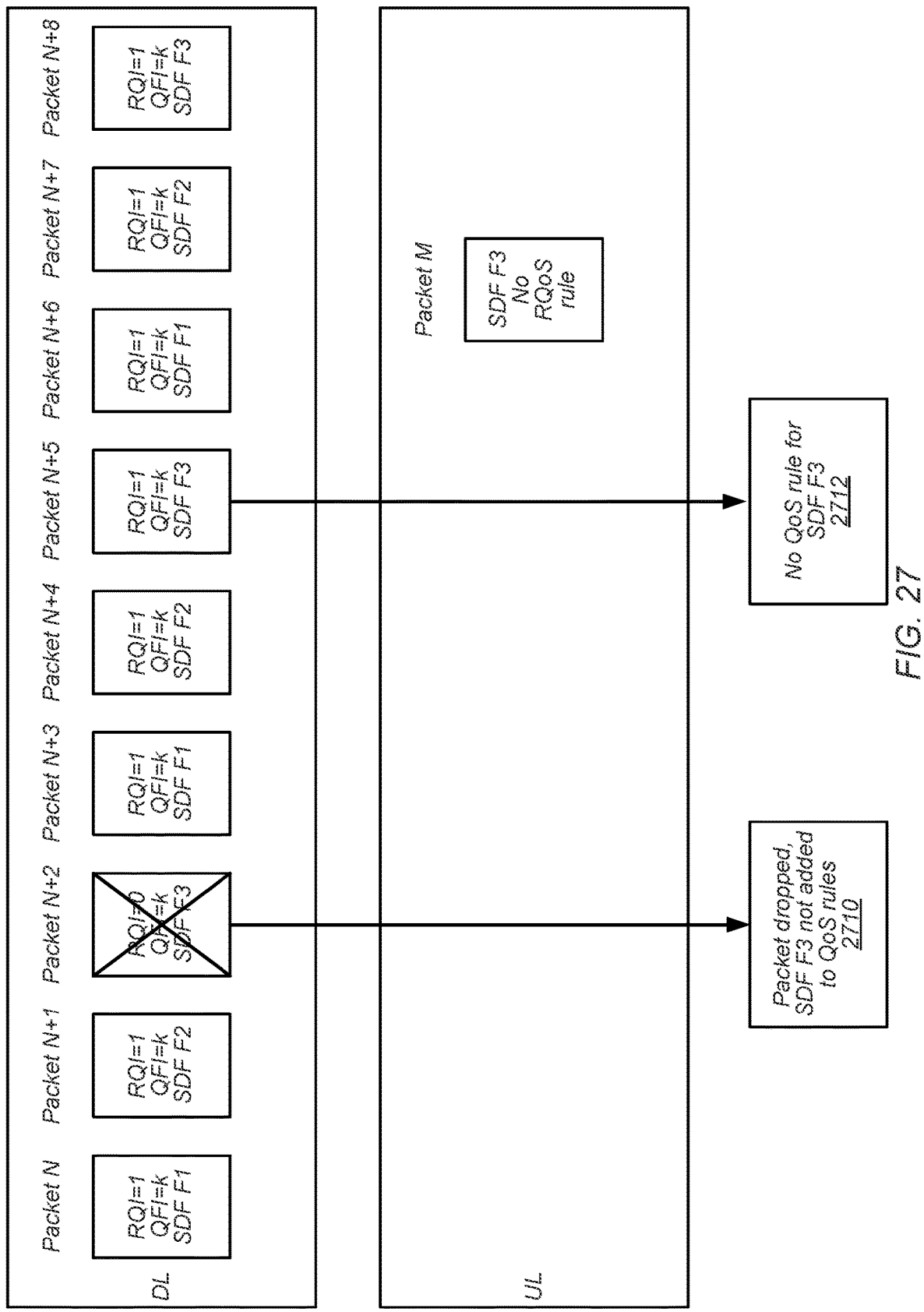
FIG. 27 illustrates an example of packet loss while using HERQ processing, according to some embodiments.
Figure 28:
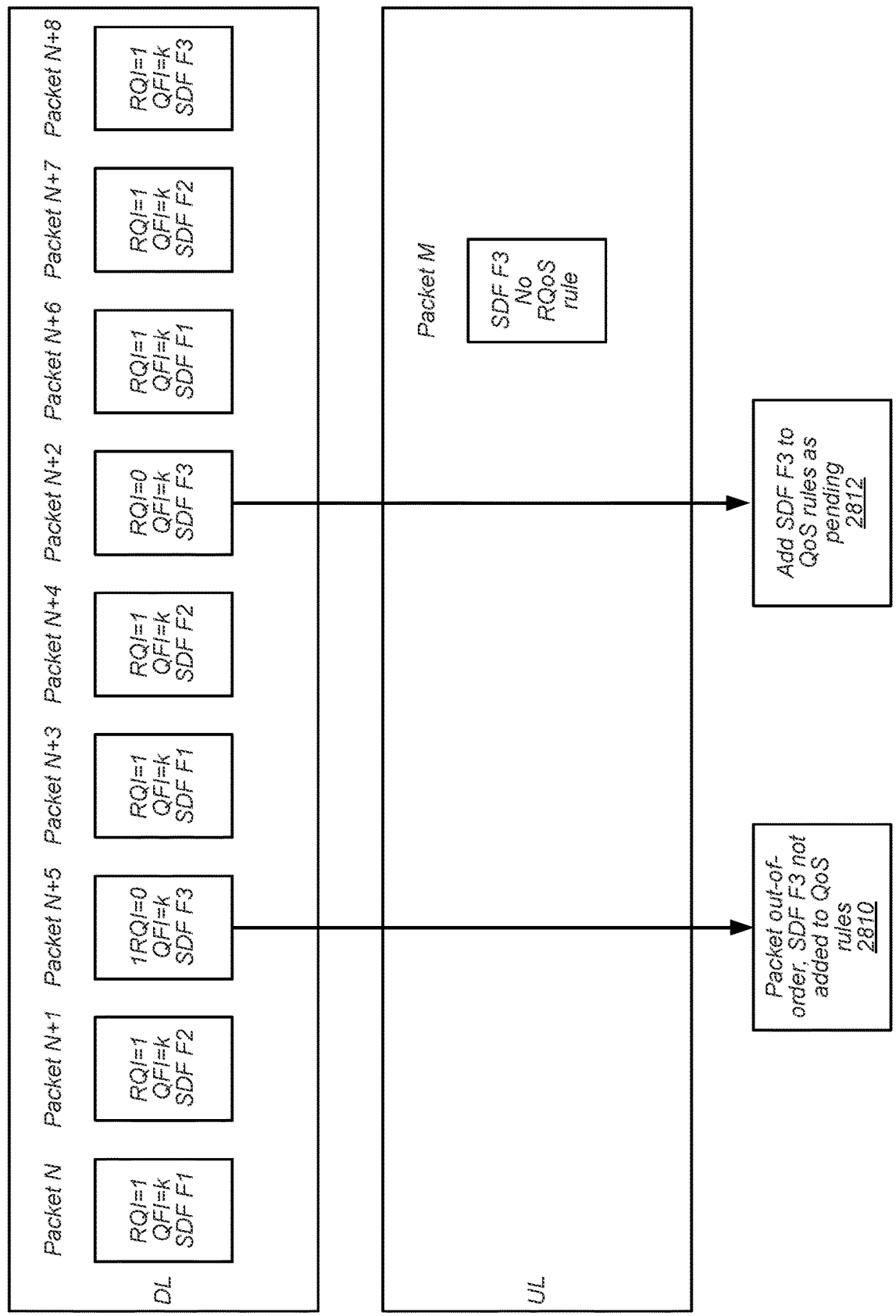
FIG. 28 illustrates an example of out-of-order packet reception while using HERQ processing, according to some embodiments.
Figure 29:
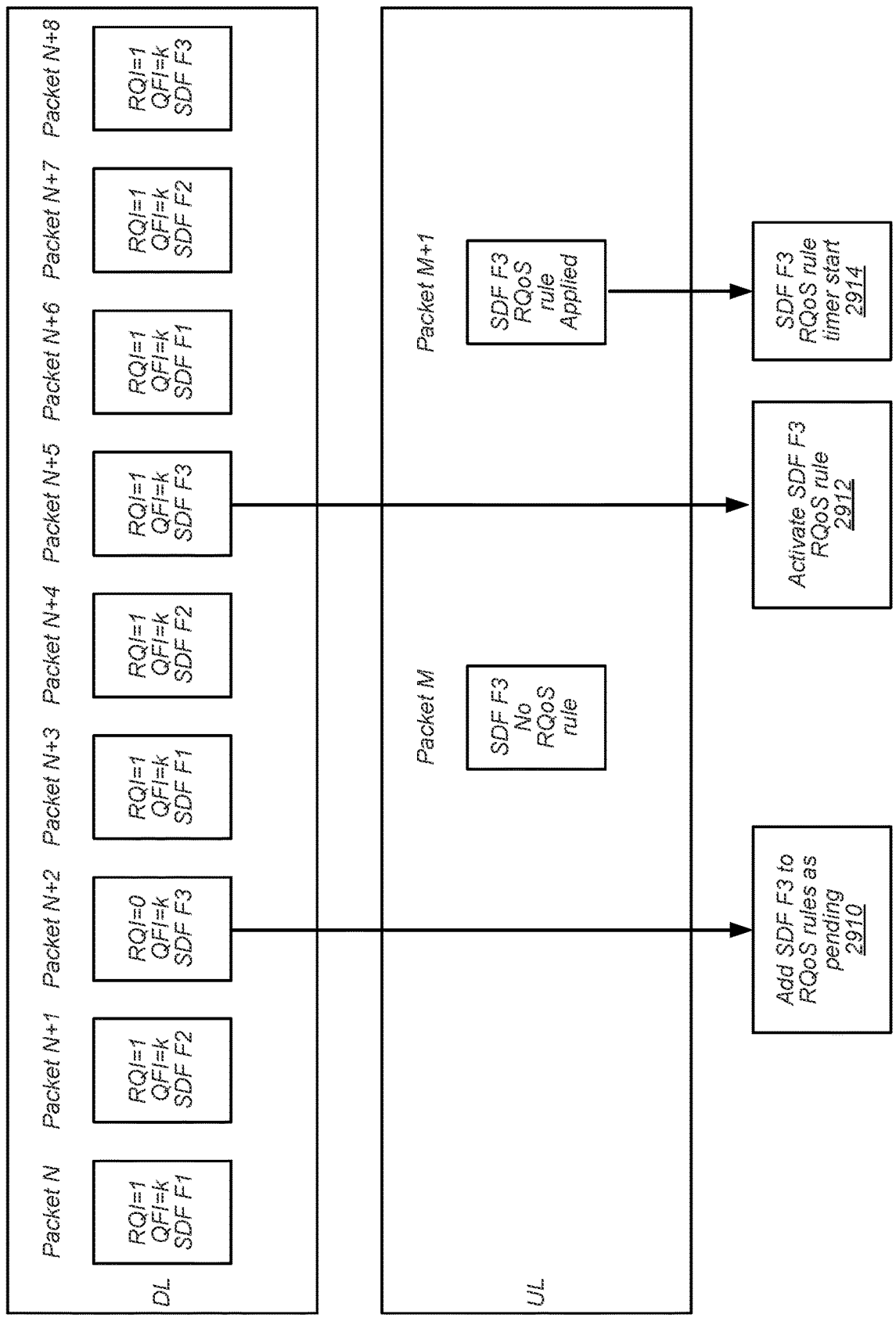
FIG. 29 illustrates an example of RQoS timer reset while using HERQ processing, according to some embodiments.

FIGS. 26, 27, 28, and 29 illustrate various examples of use cases for HERQ processing. For example, FIG. 26 illustrates an example of multiple SDFs in an RQoS flow (e.g., multiple SDFs associated with a particular QFI value) while using HERQ processing, according to some embodiments. Additionally, FIG. 27 illustrates an example of packet loss while using HERQ processing, according to some embodiments. Further, FIG. 28 illustrates an example of out-of-order packet reception while using HERQ processing, according to some embodiments. In addition, FIG. 29 illustrates an example of RQoS timer reset while using HERQ processing, according to some embodiments.

Turning to FIG. 26, a UE, such as UE 106, may receive downlink packets, as shown. In particular, downlink packet N may include an RQI bit set to 1, a QFI value of k, and may be associated with SDF flow F1. Similarly, downlink packet N+1 may include an RQI bit set to 1, a QFI value of k, and may be associated with SDF flow F2. Thus, according to HERQ processing, the UE may skip full parsing of SDAP headers for these packets, as well as packets N+3, N+4, N+6, N+7, and N+8, e.g., since there is not a change in RQI bit value. However, downlink packet N+2 may include an RQI bit set to 0, a QFI value of k, and may be associated with an SDF flow F3. Since the RQI bit is set to 0, the UE may parse the SDAP header and derive an RQoS rule associated with SDF flow F3 at 2610. Further, per HERQ processing, the UE may set a state of the derived RQoS rule associated with SDF flow F3 to "pending". In other words, the UE may not activate and/or use the derived RQoS rule for uplink packets, such as uplink packet M, as shown. However, upon receipt of downlink packet N+5, which may include an RQI bit set to 1, a QFI value of k, and may be associated with SDF flow F3, the UE may active the derived RQoS rule associated with SDF flow F3 at 2612. In other words, per HERQ processing, based on the change of the RQI bit for SDF flow F3 from a value of 0 to a value of 1, the UE may activate the derived RQoS rule for uplink packets, such as uplink packet M+1, as shown.

Turning to FIG. 27, a UE, such as UE 106, may receive downlink packets, as shown. In particular, downlink packet N may include an RQI bit set to 1, a QFI value of k, and may be associated with SDF flow F1. Similarly, downlink packet N+1 may include an RQI bit set to 1, a QFI value of k, and may be associated with SDF flow F2. Thus, according to HERQ processing, the UE may skip full parsing of SDAP headers for these packets, as well as packets N+3, N+4, N+6, N+7, and N+8, e.g., since there is not a change in RQI bit value. Further, as shown, downlink packet N+2 may not be received (e.g., may be a dropped packet). Thus, although packet N+2 included an RQI bit set to 0, a QFI value of k, and may be associated with an SDF flow F3, since the UE did not receive the downlink packet N+2, the UE does not derive an RQoS rule associated with SDF flow F3 at 2710. Further, upon receipt of downlink packet N+5, which may include an RQI bit set to 1, a QFI value of k, and may be associated with SDF flow F3, the UE may not detect a change in RQI bit or a need to parse the SDAP header of downlink packet N+5, thus, at 2712, no RQoS rule associated with SDF flow F3 is derived. In other words, per HERQ processing, based on the value of the RQI bit in downlink packet N+5 being set to 1, the UE may skip parsing of the SDAP header. Hence, when uplink packet M is transmitted for SDF flow F3, no RQoS rule may be applied, as shown.

Turning to FIG. 28, a UE, such as UE 106, may receive downlink packets, as shown. In particular, downlink packet N may include an RQI bit set to 1, a QFI value of k, and may be associated with SDF flow F1. Similarly, downlink packet N+1 may include an RQI bit set to 1, a QFI value of k, and may be associated with SDF flow F2. Thus, according to HERQ processing, the UE may skip full parsing of SDAP headers for these packets, as well as packets N+3, N+4, N+6, N+7, and N+8, e.g., since there is not a change in RQI bit value. Further, as shown, downlink packet N+2 may not be received prior to downlink packet N+5 (e.g., the downlink packets may be delivered out of order. Thus, upon receipt of downlink packet N+5 (e.g., prior to receipt of downlink packet N+2) which may include an RQI bit set to 1, a QFI value of k, and may be associated with SDF flow F3, the UE may not detect a change in RQI bit or a need to parse the SDAP header of downlink packet N+5, thus, at 2710, no RQoS rule associated with SDF flow F3 is derived. In other words, per HERQ processing, based on the value of the RQI bit in downlink packet N+5 being set to 1, the UE may skip parsing of the SDAP header. Then, upon receipt of packet N+2 (e.g., after receipt of downlink packet N+5), which may include an RQI bit set to 0, a QFI value of k, and may be associated with an SDF flow F3, the UE may parse the SDAP header and derive an RQoS rule associated with SDF flow F3 at 2812, e.g., since the RQI bit is set to 0. Further, per HERQ processing, the UE may set a state of the derived RQoS rule associated with SDF flow F3 to "pending". In other words, the UE may not activate and/or use the derived RQoS rule for uplink packets, such as uplink packet M, as shown.

Turning to FIG. 29, a UE, such as UE 106, may receive downlink packets, as shown. In particular, downlink packet N may include an RQI bit set to 1, a QFI value of k, and may be associated with SDF flow F1. Similarly, downlink packet N+1 may include an RQI bit set to 1, a QFI value of k, and may be associated with SDF flow F2. Thus, according to HERQ processing, the UE may skip full parsing of SDAP headers for these packets, as well as packets N+3, N+4, N+6, N+7, and N+8, e.g., since there is not a change in RQI bit value. However, downlink packet N+2 may include an RQI bit set to 0, a QFI value of k, and may be associated with an SDF flow F3. Since the RQI bit is set to 0, the UE may parse the SDAP header and derive an RQoS rule associated with SDF flow F3 at 2910. Further, per HERQ processing, the UE may set a state of the derived RQoS rule associated with SDF flow F3 to "pending". In other words, the UE may not activate and/or use the derived RQoS rule for uplink packets, such as uplink packet M, as shown. However, upon receipt of downlink packet N+5, which may include an RQI bit set to 1, a QFI value of k, and may be associated with SDF flow F3, the UE may active the derived RQoS rule associated with SDF flow F3 at 2912. In other words, per HERQ processing, based on the change of the RQI bit for SDF flow F3 from a value of 0 to a value of 1, the UE may activate the derived RQoS rule for uplink packets, such as uplink packet M+1, as shown. In addition, upon transmission of uplink packet M+1, the UE may start (and/or initiate) an RQoS timer associated with SDF flow F3 for QFI k at 2914.

Further Embodiments

In some embodiments, a method for using a backoff timer to reset a Reflective Quality of Service (QoS) Indicator (RQI) bit for downlink packets of a flow destined for a user equipment device (UE) may include a user plane function (UPF) of a core network determining that reflective QoS (RQoS) for a flow destined for the UE is enabled, determining that a QoS Flow Identifier (QFI) value for the flow requires updating and/or installing, and initiating the backoff timer prior to re-setting an RQI bit to a value of 1 for downlink packets of the flow destined for the UE.

In some embodiments, a value of the backoff timer may be provided to the UPF by a session management function (SMF) of the core network.

In some embodiments, a value of the backoff timer may be less than a value of a Reflective QoS (RQoS) inactivity timer (RQ timer). In some embodiments, the value of the backoff timer may be determined as RQ Timer/k. In some embodiments, k may be greater than or equal to two. In some embodiments, the value of the backoff timer may be determined as MAX {X, MIN{RQ Timer/2, Y}}. In some embodiments, X may be specified in seconds and Y may be specified in minutes.

In some embodiments, a method for using a counter-based reset of a Reflective Quality of Service (QoS) Indicator (RQI) bit for downlink packets of a flow destined for a user equipment device (UE) may include a user plane function (UPF) of a core network determining that reflective QoS (RQoS) for a flow destined for the UE is enabled, determining that a QoS Flow Identifier (QFI) value for the flow requires updating and/or installing, and setting an RQI bit to 1 for a first N packets of the flow sent to the UE.

In some embodiments, the value of N may be greater than or equal to 1.

In some embodiments, the value for N may be provided by a session management function (SMF) of the core network.

In some embodiments, the value of N may not exceed a network specified value.

In some embodiments, the method may further include the UPF initiating a backoff timer prior to re-setting an RQI bit to a value of 1 for downlink packets of the flow destined for the UE. In some embodiments, a value of the backoff timer may be provided to the UPF by a session management function (SMF) of the core network. In some embodiments, a value of the backoff timer may be less than a value of a Reflective QoS (RQoS) inactivity timer (RQ timer). In some embodiments, the value of the backoff timer may be determined as RQ Timer/k. In some embodiments, k may be greater than or equal to two. In some embodiments, the value of the backoff timer may be determined as MAX {X, MIN{RQ Timer/2, Y}}.

In some embodiments, a method for using a backoff timer in conjunction with a counter to reset a Reflective Quality of Service (QoS) Indicator (RQI) bit for downlink packets of a flow destined for a user equipment device (UE) may include a user plane function (UPF) of a core network determining that reflective QoS (RQoS) for a flow destined for the UE is enabled, determining that a QoS Flow Identifier (QFI) value for the flow requires updating and/or installing, setting an RQI bit to 1 for a first N packets of the flow sent to the UE, and initiating the backoff timer prior to re-setting the RQI bit to a value of 1 for downlink packets of the flow destined for the UE.

In some embodiments, the value of N may be greater than or equal to 1.

In some embodiments, the value for N may be provided by a session management function (SMF) of the core network.

In some embodiments, the value of N may not exceed a network specified value.

In some embodiments, a value of the backoff timer may be provided to the UPF by a session management function (SMF) of the core network.

In some embodiments, a value of the backoff timer may be less than a value of a Reflective QoS (RQoS) inactivity timer (RQ timer). In some embodiments, the value of the backoff timer may be determined as RQ Timer/k. In some embodiments, k may be greater than or equal to two. In some embodiments, the value of the backoff timer may be determined as MAX {X, MIN{RQ Timer/2, Y}}. In some embodiments, X may be specified in seconds and Y may be specified in minutes.

In some embodiments, a method for generating a flow identifier (ID) to include in a service data adaptation protocol (SDAP) header destined for a user equipment device (UE) may include a user plane function (UPF) of a core network determining that reflective Quality of Service (QoS) for a flow destined for the UE is enabled, generating a flow ID for the UE, wherein the flow ID is per protocol data unit (PDU) session, and including the flow ID in an N3 encapsulation header of a downlink packet destined to the UE for a flow for which a QoS Flow Identifier (QFI) requires updating or installation.

In some embodiments, the flow ID may be based, at least in part, on a five tuple packets or a four tuple of the downlink packet. In some embodiments, the five tuple may include a source Internet Protocol (IP) address, a destination IP address, a source port number, a destination port number, and/or a next_header field in an IP header field. In some embodiments, the five tuple may be included in one of a transmission control protocol (TCP) downlink packet or a user datagram protocol (UDP) downlink packet. In some embodiments, the four tuple may include a source Internet Protocol (IP) address, a destination IP address, a next_header field in an IP header field, and/or a security parameters index (SPI) field in an ESP header.

In some embodiments, the flow ID field may be limited to 8 bits. In some embodiments, limiting the flow ID field to 8 bits may limit the total number of active flows for the UE to 255.

In some embodiments, a size of a service data adaptation protocol (SDAP) header may be two bytes. In some embodiments, 1 byte may be reserved for the flow ID.

In some embodiments, a method for using a flow identifier (ID) to limit parsing of layer 3 (L3) and layer 4 (L4) headers of a service data adaptation protocol (SDAP) header associated with a Reflective Quality of Service (QoS) feature of a network may include a user equipment device (UE) maintaining a flow ID to QoS Flow Identifier (QFI) mapping table per protocol data unit (PDU) session with the network, receiving a downlink packet with a Reflective QoS Indicator (RQI) bit set to a value of 1, wherein the downlink packet includes the flow ID in an SDAP header, determining whether the flow ID included in the downlink packet is in the QFI mapping table, in response to determining that the flow ID is in the QFI mapping table, determining whether there is a change in QFI fields of the SDAP header, and in response to determining that there is a change in QFI fields of the SDAP header, updating the flow ID to QFI mapping.

In some embodiments, the method may further include the UE, in response to determining that the flow ID is not in the QFI mapping table, adding the flow ID to the QFI mapping table. In some embodiments, the method may further include the UE parsing the SDAP header. In some embodiments, parsing the SDAP header may include parsing L3/L4 fields of the SDAP header.

In some embodiments, determining whether the flow ID included in the downlink packet is in the QFI mapping table may include the UE searching the QFI mapping table for the flow ID included in the downlink packet.

In some embodiments, the flow ID may be based, at least in part, on a five tuple packets or a four tuple of the downlink packet. In some embodiments, the five tuple includes a source Internet Protocol (IP) address, a destination IP address, a source port number, a destination port number, and/or a next_header field. In some embodiments, the five tuple may be included in one of a transmission control protocol (TCP) downlink packet or a user datagram protocol (UDP) downlink packet. In some embodiments, the four tuple may include a source Internet Protocol (IP) address, a destination IP address, a next_header field, and/or a security parameters index (SPI) field.

In some embodiments, the flow ID field may be limited to 8 bits. In some embodiments, limiting the flow ID field to 8 bits may limit the total number of active flows for the UE to 255.

In some embodiments, a size of the SDAP header may be two bytes. In some embodiments, 1 byte may be reserved for the flow ID.

In some embodiments, the method may further include the UE ignoring parsing of the L3/L4 header fields of the SDAP header.

In some embodiments, the method may further include the UE, in response to determining that there is no change in QFI fields of the SDAP header, ignoring parsing of the L3/L4 header fields of the SDAP header.

In some embodiments, the L3 header field may include a transmission control protocol (TCP) header field.

In some embodiments, the L4 header field may include an Internet Protocol (IP) header filed.

In some embodiments, the method may further include the UE deleting flow IDs from the QFI mapping table when a Reflective QoS timer (RQ).

In some embodiments, the method may further include the UE deleting flow IDs from the QFI mapping table at an end of a radio resource control (RRC) connection. In some embodiments, the end of the RRC connection may correspond to the UE transitioning from an RRC connected state to an RRC idle state.

In some embodiments, a method for sending feedback regarding processing of a Reflective Quality of Service (QoS) Indicator (RQI) bit associated with a Reflective QoS (RQoS) feature of a network may include a user equipment device (UE) receiving a downlink packet with RQI bit set to a value of 1, processing the downlink packet to derive one or more RQoS rules for uplink transmissions to the network, and transmitting feedback indicating and/or regarding processing of the RQI bit on an uplink connection to the network.

In some embodiments, the feedback may indicate derivation of the one or more RQoS rules for uplink transmissions.

In some embodiments, the feedback may include an end marker protocol data unit (PDU) on the uplink. In some embodiments, the end marker PDU may include a zero-payload length packet and a reference to layer 3 (L3) and layer 4 (L4) header fields of a service data adaptation protocol (SDAP) header included in the downlink packet. In some embodiments, the L3 and/or L4 header fields may match a derived RQoS rule.

In some embodiments, the feedback may include a service data adaptation protocol (SDAP) header signaled as a control protocol data unit (PDU). In some embodiments, the control PDU may include a QoS Flow Indicator (QFI) which was included in the downlink packet.

In some embodiments, a method for receiving feedback regarding processing of a Reflective Quality of Service (QoS) Indicator (RQI) bit associated with a Reflective QoS (RQoS) feature of a network may include a user plane function (UPF) of the network transmitting a downlink packet with the RQI bit set to a value of 1, receiving feedback indicating and/or regarding processing of the RQI bit, and after confirming that layer 3 (L3) and layer 4 (L4) header fields of a service data adaptation protocol (SDAP) header and a QoS Flow Indicator (QFI) value included in the feedback match an uplink packet data report received from a session management function (SMF) of the network for a flow associated with the downlink packet, discontinuing including the RQI bit for subsequent packets of the flow on the downlink.

In some embodiments, discontinuing including the RQI bit for the subsequent packets of the flow on the downlink may include the UPF of the network setting a value of the RQI bit to 0 for the subsequent packets of the flow on the downlink.

In some embodiments, the feedback may indicate derivation of the one or more RQoS rules for uplink transmissions.

In some embodiments, the feedback may include an end marker protocol data unit (PDU) on the uplink. In some embodiments, the end marker PDU may include a zero-payload length packet and a reference to the L3 and the L4 header fields of the SDAP header included in the downlink packet. In some embodiments, the L3 and/or L4 header fields may match a derived RQoS rule.

In some embodiments, the feedback may include the SDAP header signaled as a control protocol data unit (PDU). In some embodiments, the control PDU may include a QFI which was included in the downlink packet.

In some embodiments, the method may further include the UPF forwarding the data packets received from the UE to a destination Internet Protocol (IP) address indicated in the SDAP header.

In some embodiments, the method may further include the UPF setting an RQI bit to 1 for a first N packets of a flow sent to the UE, and initiating the backoff timer prior to re-setting the RQI bit to a value of 1 for downlink packets of the flow destined for the UE. In some embodiments, the value of N may be greater than or equal to 1. In some embodiments, the value for N may be provided by a session management function (SMF) of the core network. In some embodiments, the value of N may not exceed a network specified value. In some embodiments, a value of the backoff timer may be provided to the UPF by a session management function (SMF) of the core network. In some embodiments, the value of the backoff timer may be less than a value of a Reflective QoS (RQoS) inactivity timer (RQ timer). In some embodiments, the value of the backoff timer may be determined as RQ Timer/k. In some embodiments, k may be greater than or equal to two. In some embodiments, the value of the backoff timer may be determined as MAX {X, MIN{RQ Timer/2, Y}}. In some embodiments, X may be specified in seconds and Y may be specified in minutes.

In some embodiments, a method for maintaining a Quality of Service (QoS) Flow Indicator (QFI) mapping table for downlink packets associated with Reflective QoS (RQoS) may include a user equipment device (UE) receiving a downlink packet with a RQoS Indicator (RQI) bit set to a value of 1, comparing a QFI value included in the downlink packet with a locally maintained QFI mapping table, confirming whether the QFI value included in the downlink packet exists in the QFI mapping table, and, in response to determining that the QFI value is included in the QFI mapping table, skipping parsing of layer 3 (L3) and layer 4 (L4) header fields included in the downlink packet.

In some embodiments, the method may further include the UE, in response to determining that the QFI value is not included in the QFI mapping table, parsing the L3 and L4 header fields included in the downlink packet, and deriving one or more RQoS rules for uplink transmissions.

In some embodiments, the method may further include the UE adding the QFI value to the QFI mapping table.

In some embodiments, the method may further include the UE receiving consecutive downlink packets on a specific dedicated resource bearer (DRB) with an RDI bit value set to 1, determining that a QFI value indicated in the consecutive downlink packets is part of the QFI mapping table, and not sending an RDI end marker on the uplink.

In some embodiments, a method for skipping parsing of service data adaptation protocol (SDAP) header fields associated with a Reflective Quality of Service (QoS) feature of a network may include a user equipment device (UE) determining that a throughput for downlink packets associated with the Reflective QoS (RQoS) feature exceeds a threshold and, in response to determining that the throughput exceeds the threshold, parsing SDAP header fields for every Nth downlink packet of a flow that is received with an RQoS Indicator (RQI) bit set to a value of 1.

In some embodiments, determining that the throughput for downlink packets associated with the RQoS feature exceeds a threshold may include the UE determining that throughput of downlink packets of the flow with the RQI bit set to a value of 1 exceeds the threshold.

In some embodiments, the threshold may be within a range of 200 to 1000 megabytes per second.

In some embodiments, the threshold may depend, at least in part, on a power state of the UE, a power level of a battery powering the UE, and/or a thermal load of the UE.

In some embodiments, N may a number ranging between 10 and 100.

In some embodiments, a value of N may depend, at least in part, on a value of the threshold.

In some embodiments, a method for specifying and signaling a Quality of Service (QoS) Flow Indicator (QFI) range to a user equipment device (UE) may include a service management function (SMF) of a core network reserving a QFI range with a same 5G Standardized QoS Identifier (5QI) value and signaling a mapping between QFI values and 5QI without association to an Internet Protocol (IP) flow to the UE.

In some embodiments, reserving the QFI range may include the SMF reserving up to 16 QFI values corresponding to the same 5QI.

In some embodiments, the mapping may include a QoS flow description information element without associated QoS rule.

In some embodiments, the mapping may be signaled via network access stratum (NAS) signaling during a protocol data unit (PDU) session establishment procedure.

In some embodiments, a method for limiting downlink header parsing associated with Reflective Quality of Service (QoS) may include a user equipment device (UE) determining that processor utilization associated with parsing of the downlink packet headers associated with Reflective QoS (RQoS) has exceeded a threshold, initiating a backoff timer in response to the processor utilization exceeding the threshold, and ignoring further RQoS Indicator (RQI) updates received in downlink packets until expiration of the backoff timer.

In some embodiments, the threshold may range between 50 and 90 percent processor utilization.

In some embodiments, the threshold may depend, at least in part, on a power state of the UE, a power level of a battery powering the UE, and/or a thermal load of the UE.

In some embodiments, the backoff timer nay depend, at least in part, on a power state of the UE, a power level of a battery powering the UE, or a thermal load of the UE.

In some embodiments, ignoring the further RQI updates received in downlink packets until expiration of the backoff timer may include the UE skipping parsing of service data adaptation protocol (SDAP) headers of downlink packets associated with RQoS until expiration of the backoff timer.

In some embodiments, a method for limiting downlink header parsing associated with Reflective Quality of Service (QoS) may include a user equipment device (UE) determining that processor utilization associated with parsing of the downlink packet headers associated with Reflective QoS (RQoS) has exceeded a threshold, triggering a protocol data unit (PDU) session modification procedure in response to the processor utilization exceeding the threshold, and indicating, as part of the PDU session modification procedure, no support for RQoS.

In some embodiments, the UE may indicate a set of packet filters which were configured via RQoS as part of the PDU session modification procedure. In some embodiments, the set of packet filters may be included in an uplink PDU session modification request message.

In some embodiments, the threshold may range between 50 and 90 percent processor utilization.

In some embodiments, the threshold may depend, at least in part, on a power state of the UE, a power level of a battery powering the UE, and/or a thermal load of the UE.

In some embodiments, a method for updating a Quality of Service (QoS) Flow Indicator (QFI) may include a network entity determining that a service data flow (SDF) will last longer than a specified duration and applying an updated QFI mapping for the flow via network access stratum (NAS) control plane signaling with a UE.

In some embodiments, the specified duration may be on the order of minutes.

In some embodiments, a duration of the flow may be determined based on Differentiated Services Code Point (DSCP)/Type of Service (TOS) marking of an incoming packet.

In some embodiments, a duration of the flow may be determined based on a 5G Standardized QoS Identifier (5QI) value of an incoming IP packet.

In some embodiments, the NAS control plane signaling may be triggered by a protocol data unit (PDU) session modification procedure.

In some embodiments, a method for high efficiency Reflective Quality of Service (QoS) processing may include a user equipment device (UE) receiving a downlink packet with a Reflective QoS (RQoS) Indicator (RQI) bit set to a value of 1, determining whether a last received downlink packet in the flow had an RQI bit set to a value of 1, and, in response to determining that the last received downlink packet in the flow had an RQI bit set to a value of 1, skipping full parsing of a service data adaptation protocol (SDAP) header included in the downlink packet.

In some embodiments, the downlink packet may be associated with a flow, wherein the flow is associated with a particular QoS Flow Indicator (QFI) value.

In some embodiments, the method may further include the UE allowing an RQoS timer associated with the flow to continue.

In some embodiments, the method may further include the UE, in response to determining that the last received downlink packet in the flow did not have an RQI bit set to a value of 1, parsing fields of the SDAP header of the downlink packet, deriving an RQoS rule for uplink included in the fields of the SDAP header, and setting a state of the derived RQoS rule as pending. In some embodiments, the method may further include the UE changing the state of the derived RQoS rule to active and initiating an RQoS timer associated with the flow.

In some embodiments, a method for high efficiency Reflective Quality of Service (QoS) processing may include a user equipment device (UE) receiving a downlink packet with a Reflective QoS (RQoS) Indicator (RQI) bit set to a value of 0, determining whether a last received downlink packet in the flow had an RQI bit set to a value of 0, and, in response to determining that the last received downlink packet in the flow had an RQI bit set to a value of 0, parsing a service data adaptation protocol (SDAP) header included in the downlink packet.

In some embodiments, the method may further include the UE deriving an RQoS rule for uplink included in the fields of the SDAP header and setting a state of the derived RQoS rule as pending.

In some embodiments, the method may further include the UE, in response to determining that the last received downlink packet in the flow did not have an RQI bit set to a value of 1, skipping full parsing of the SDAP header included in the downlink packet. In some embodiments, the method may further include the UE allowing an RQoS time associated with the flow to continue.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user plane function (UPF) of a core network, comprising:
 a memory; and
 at least one processor in communication with the memory, wherein the at least one processor is configured to cause the UPF to:
  determine that Reflective Quality of Service (QoS) for a flow destined for a user equipment device (UE) is enabled;
  determine that a QoS Flow Identifier (QFI) value for the flow requires updating or installing; and
  initiate a backoff timer prior to re-setting a Reflective QoS (RQoS) Indicator (RQI) bit in a service data adaptation protocol (SDAP) header to a value of 1 for downlink packets of the flow destined for the UE, wherein the backoff timer is associated with limiting reset of the RQI bit.

2. The UPF of claim 1,
wherein a value of the backoff timer is provided to the UPF by a session management function (SMF) of the core network.

3. The UPF of claim 1,
wherein a value of the backoff timer is less than a value of a Reflective QoS (RQoS) inactivity timer (RQ timer), wherein the value of the RQ timer is greater than 0.

4. The UPF of claim 3,
wherein a value of the backoff timer is determined as RQ Timer/k, wherein k is greater than 0.

5. The UPF of claim 4,
wherein k is greater than or equal to two.

6. The UPF of claim 3,
wherein the value of the backoff timer is determined as MAX {X, MIN {RQ Timer/2, Y} }, wherein X is greater than 0, and wherein Y is greater than 0.

7. The UPF of claim 6,
wherein X is specified in seconds and Y is specified in minutes.

8. A non-transitory computer readable memory medium storing program instructions executable by processing circuitry of a user plane function (UPF) of a core network to cause the UPF to:
determine that Reflective Quality of Service (QoS) or a flow destined for a user equipment (UE) is enabled;
determine that a QoS Flow Identifier (QFI) value for the flow requires updating or installing; and
initiate a backoff timer prior to resetting a Reflective QoS (RQoS) Indicator (RQI) bit in a service data adaptation protocol (SDAP) header to a value of 1 for downlink packets of the flow destined for the UE, wherein the backoff timer is associated with limiting reset of the RQI bit; and
re-set, responsive to the determination that the QFI value for the flow requires updating or installing, the RQI bit in the SDAP header to 1 for a first N packets of the flow sent to the UE, wherein a value of N is greater than 0.

9. The non-transitory computer readable memory medium of claim 8,
wherein the value for N is provided by a session management function (SMF) of the core network.

10. The non-transitory computer readable memory medium of claim 8,
wherein the value of N does not exceed a network specified value.

11. The non-transitory computer readable memory medium of claim 8,
wherein a value of the backoff timer is provided to the UPF by a session management function (SMF) of the core network.

12. The non-transitory computer readable memory medium of claim 8,
wherein a value of the backoff timer is less than a value of a Reflective QoS (RQoS) inactivity timer (RQ Timer), wherein a value of the backoff timer is determined as RQ Timer/k or as MAX {X, MIN{RQ Timer/2, Y}}, wherein k is greater than or equal to two, and wherein values of RQ Timer, X, and Y are greater than 0.

13. The non-transitory computer readable memory medium of claim 12,
wherein X is specified in seconds and Y is specified in minutes.

14. An apparatus, comprising:
a memory; and
a processor in communication with the memory, wherein the processor is configured to:
determine that Reflective Quality of Service (QoS) for a flow destined for a user equipment device (UE) is enabled;
determine that a QoS Flow Identifier (QFI) value for the flow requires updating or installing;
set a Reflective QoS (RQoS) Indicator (RQI) bit to 1 for a first N packets of the flow sent to the UE, wherein a value of N is greater than 0; and
initiate a backoff timer prior to re-setting the RQI bit to a value of 1 for downlink packets of the flow destined for the UE, wherein the backoff timer is associated with limiting reset of the RQI bit.

15. The apparatus of claim 14,
wherein the value for N is provided by a session management function (SMF) of a core network.

16. The apparatus of claim 14,
wherein the value of N does not exceed a network specified value.

17. The apparatus of claim 14,
wherein a value of the backoff timer is less than a value of a Reflective QoS (RQoS) inactivity timer (RQ Timer), wherein a value of the RQ Timer is greater than 0.

18. The apparatus of claim 17,
wherein a value of the backoff timer is determined as RQ Timer/k or as MAX {X, MIN{RQ Timer/2, Y}}, wherein values of k, X, and Y are greater than 0.

19. The apparatus of claim 18,
wherein k is greater than or equal to two.

20. The apparatus of claim 18,
wherein X is specified in seconds and Y is specified in minutes.

* * * * *